(12) United States Patent
Griffin et al.

(10) Patent No.: US 9,128,921 B2
(45) Date of Patent: Sep. 8, 2015

(54) TOUCHSCREEN KEYBOARD WITH CORRECTIVE WORD PREDICTION

(75) Inventors: Jason Tyler Griffin, Kitchener (CA); Alistair Robert Hamilton, Sammamish, WA (US); Donald Somerset McCulloch McKenzie, Waterloo (CA); Jerome Pasquero, Montreal (CA)

(73) Assignee: BlackBerry Limited, Waterloo, Ontario (CA)

( * ) Notice: Subject to any disclaimer, the term of this patent is extended or adjusted under 35 U.S.C. 154(b) by 278 days.

(21) Appl. No.: 13/484,710

(22) Filed: May 31, 2012

(65) Prior Publication Data

US 2013/0325438 A1   Dec. 5, 2013

(51) Int. Cl.
 *G06F 3/0488* (2013.01)
 *G06F 3/023* (2006.01)
 *G06F 17/27* (2006.01)

(52) U.S. Cl.
 CPC ............ *G06F 17/273* (2013.01); *G06F 3/0237* (2013.01); *G06F 3/04886* (2013.01); *G06F 17/276* (2013.01)

(58) Field of Classification Search
 CPC .. G06F 3/04886; G06F 3/0237; G06F 17/273
 USPC .................................. 345/173–178; 715/773
 See application file for complete search history.

(56) References Cited

U.S. PATENT DOCUMENTS

| 6,724,370 | B2 * | 4/2004 | Dutta et al. ................... 345/169 |
| 2006/0265668 | A1 * | 11/2006 | Rainisto ........................ 715/816 |
| 2007/0046641 | A1 * | 3/2007 | Lim ................................ 345/173 |
| 2007/0229476 | A1 * | 10/2007 | Huh ............................... 345/173 |
| 2008/0168366 | A1 | 7/2008 | Kocienda et al. |
| 2009/0058823 | A1 | 3/2009 | Kocienda |
| 2011/0201387 | A1 * | 8/2011 | Paek et al. ..................... 455/566 |

FOREIGN PATENT DOCUMENTS

WO    2010035574 A1    4/2010

OTHER PUBLICATIONS

Extended European Search Report from related European Patent Application No. 12170147.8 dated Oct. 12, 2012; 5 pages.
Canadian Office Action from related Canadian Patent Application No. 2,817,262 dated Dec. 29, 2014; 4 pages.

* cited by examiner

*Primary Examiner* — Samuel G Neway
(74) *Attorney, Agent, or Firm* — Jon Gibbons; Fleit Gibbons Gutman Bongini & Bianco P.L.

(57) ABSTRACT

The present disclosure provides a touchscreen keyboard with corrective word prediction. A method for correcting text input on an electronic device is described. The method comprises: displaying a virtual keyboard on a touchscreen, the virtual keyboard including a plurality of keys; receiving input from the virtual keyboard; generating one or more predicted sets of characters in accordance with the received input; and displaying a predicted set of characters at a designated location when the received input does not match one of the predicted sets of characters.

16 Claims, 23 Drawing Sheets

TOUCHSCREEN KEYBOARD WITH CORRECTIVE WORD PREDICTION

RELATED APPLICATION DATA

The present disclosure relates to commonly owned U.S. patent application Ser. No. 13/373,356, filed Nov. 10, 2011, which is incorporated herein by reference in its entirety.

TECHNICAL FIELD

The present disclosure relates generally to input methodologies for electronic devices, such as handheld electronic devices, and more particularly, to a touchscreen keyboard with corrective word prediction.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DESCRIPTION OF EXAMPLE EMBODIMENTS

Figure 1:
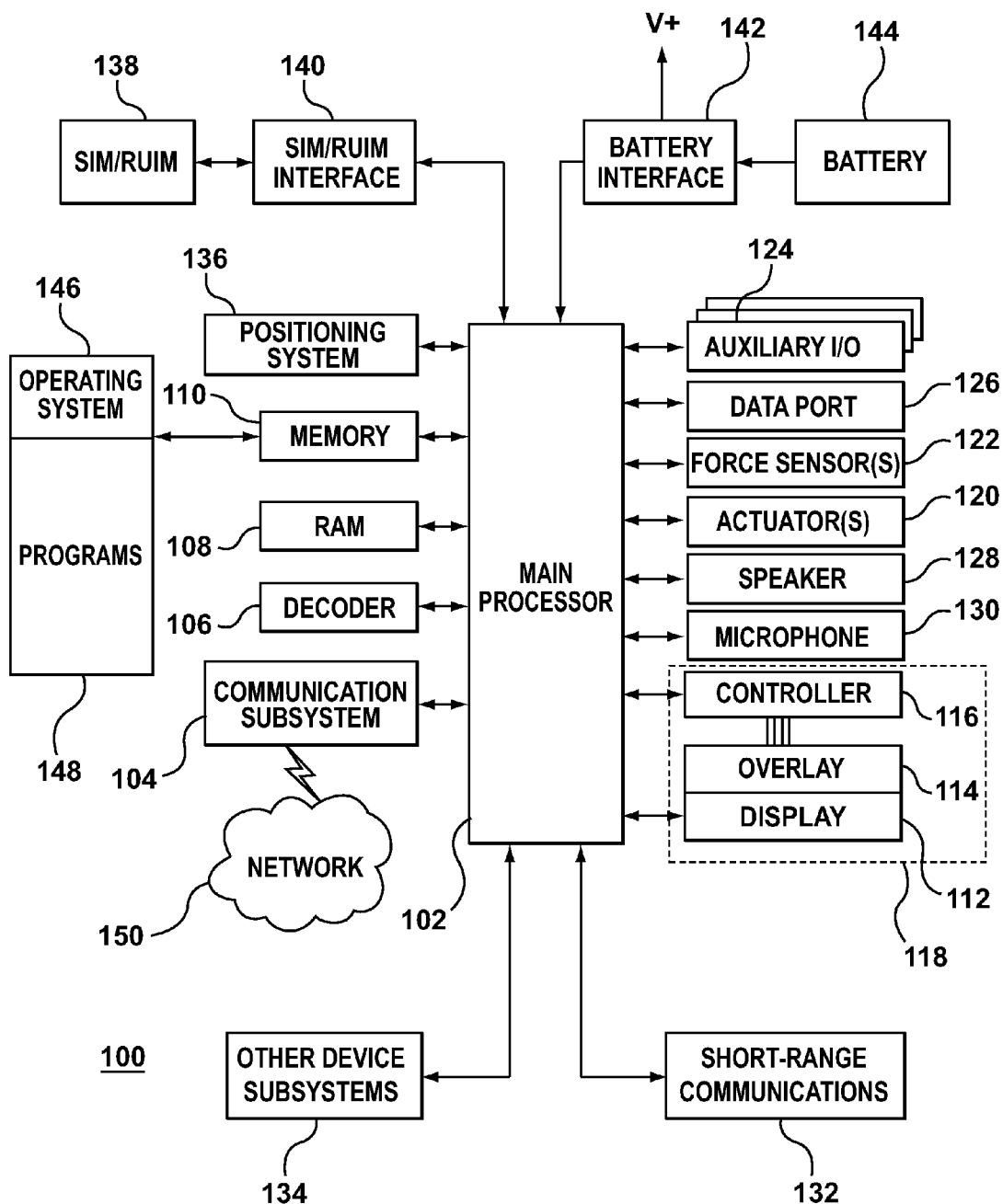
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device.

Basic predictive text input solutions have been introduced for assisting with input on an electronic device. These solutions include predicting which word a user is entering and offering a suggestion for completing the word. But these solutions can have limitations, often requiring the user to input most or all of the characters in a word before the solution suggests the word the user is trying to input. Even then, a user often has to divert focus from the keyboard to view and consider the suggested word displayed elsewhere on the display of the electronic device, and thereafter, look back at the keyboard to continue typing, Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

The efficiency of predictive text input solutions, from the perspective of both device resources and user experience, sometimes depends on the particular user and the nature of the interaction of the particular user with the touchscreen. Virtual keyboard usage patterns can be broadly categorized as being of two types: "rapid" and "precise". Rapid typists are typically fast two-thumb typists which rely on auto-correction. This usage pattern corresponds most closely with experienced, frequent touchscreen users. Precise typists are typically careful typists who are inclined to use a single finger point to tap keys in the virtual keyboard, and often choose predictions as an input accelerator rather than auto-correction. This usage pattern corresponds most closely with novice/new touchscreen users as well as potentially one-handed (thumb) use situations.

Accordingly, example embodiments described herein permit the user of an electronic device to input characters without diverting attention from the keyboard and subsequently refocusing. Example embodiments described herein also seek to accommodate different user types, such as rapid typists and precise typists, and the different efficiency challenges presented by the different user types.

Use of the indefinite article "a" or "an" in the specification and the claims is meant to include one or more than one of the features that it introduces, unless otherwise indicated. Thus, the term "a set of characters" as used in "generating a set of characters" can include the generation of one or more than one set of characters. Similarly, use of the definite article "the", or "said," particularly after a feature has been introduced with the indefinite article, is meant to include one or more than one of the features to which it refers (unless otherwise indicated). Therefore, the term "the generated sets of characters" as used in "displaying the generated set of characters" includes displaying one or more generated sets of characters. References to orientation contained herein, such as horizontal and vertical, are relative to the screen orientation of a graphical user interface rather than any physical orientation.

In accordance with one embodiment, there is provided a method comprising receiving an input of a character from a virtual keyboard displayed on a display; generating one or more sets of predicted input characters based on the input character; and displaying one or more of the sets of predicted input characters.

In accordance with another embodiment, there is provided a method for correcting text input on an electronic device, comprising: displaying a virtual keyboard on a touchscreen, the virtual keyboard including a plurality of keys; receiving input from the virtual keyboard; generating one or more predicted sets of characters in accordance with the received input; and displaying a predicted set of characters at a designated location when the received input does not match one of the predicted sets of characters.

In accordance with yet a further embodiment, an electronic device is provided that comprises a display having a virtual keyboard displayed thereupon, and a processor. The processor can be configured to perform methods described herein.

In accordance with yet a further embodiment, a keyboard displayed on a display of an electronic device is provided. The keyboard can include a plurality of keys, each key corresponding to one or more different characters of a plurality of characters. The keyboard is configured to perform methods described herein in response to receiving an input.

In accordance with yet a further embodiment, a non-transitory computer-readable storage medium is provided that includes computer executable instructions for performing methods described herein.

These example embodiments, as well as those described below, permit the user of an electronic device to input a set of characters without diverting attention from the virtual keyboard and subsequently refocusing. Predicting and providing various options that the user is likely contemplating, and doing so at appropriate locations on the keyboard, allows the focus to remain on the keyboard, which enhances efficiency, accuracy, and speed of character input.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

The main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

The touchscreen 118 includes a display 112 with a touch-sensitive overlay 114 connected to a controller 116. User-interaction with a graphical user interface (GUI), such as a virtual keyboard rendered and displayed on the display 112 as a GUI for input of characters, or a web-browser, is performed through touch-sensitive overlay 114. Main processor 102 interacts with touch-sensitive overlay 114 via controller 116. Characters, such as text, symbols, images, and other items are displayed on display 112 of touchscreen 118 via main processor 102. Characters are inputted when the user touches the touchscreen at a location associated with said character.

The touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

The main processor 102 can also interact with a positioning system 136 for determining the location of electronic device 100. The location can be determined in any number of ways, such as by a computer, by a Global Positioning System (GPS), either included or not included in electronic device 100, through a Wi-Fi network, or by having a location entered manually. The location can also be determined based on calendar entries.

The main processor 102 can also interact with an orientation sensor 197 for sensing the orientation of the device. In some examples, the orientation sensor 197 may be one or more accelerometers. In some examples, the orientation sensor may detect acceleration along multiple orthogonal axes. Main processor 102 can also interact with one or more proximity sensors 198 for detecting the proximity of nearby objects. In some examples, the proximity sensor may be one or more infrared emitter/sensor pairs. The main processor 102 can also interact with an ambient light sensor 199 for detecting the intensity and/or color temperature of ambient light.

In some embodiments, to identify a subscriber for network access, electronic device 100 uses a Subscriber Identity Module or a Removable User Identity Module (SIM/RUIM) card 138 inserted into a SLM/RUIM interface 140 for communication with a network, such as network 150. Alternatively, user identification information can be programmed into memory 110.

The electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Text Prediction

Figure 2:
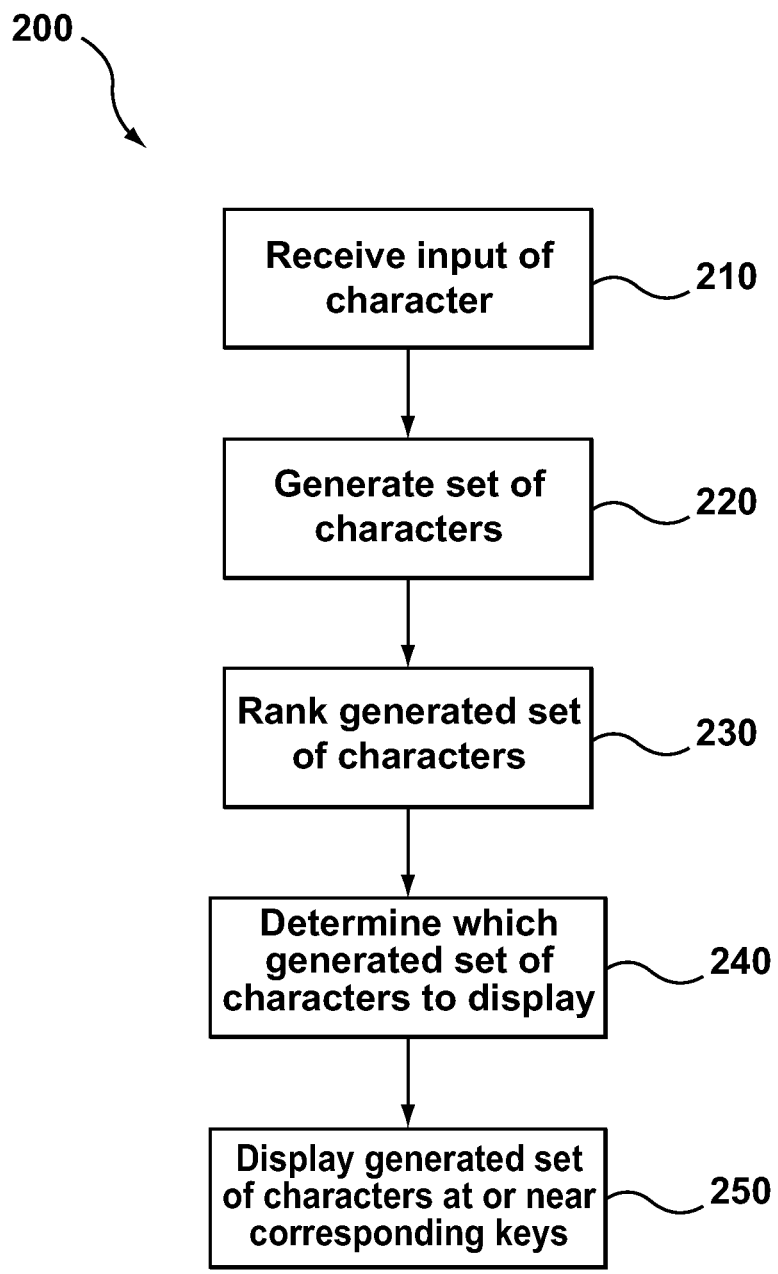
FIG. 2 is a flowchart illustrating an example method for predicting a selected set of characters, consistent with embodiments disclosed herein.

FIG. 2 is a flowchart illustrating an example method 200 for predicting a set of characters, consistent with example embodiments disclosed herein. As used herein, a predictor (such as a predictive algorithm, program or firmware) includes a set of instructions that when executed by a processor (for example, main processor 102), can be used to disambiguate for example, received ambiguous text input and provide various options, such as a set of characters (for example, words or phrases, acronyms, names, slang, colloquialisms, abbreviations, or any combination thereof) that a user might be contemplating. A predictor can also receive otherwise unambiguous text input and predict a set of characters potentially contemplated by the user based on several factors, such as context, frequency of use, and others as appreciated by those skilled in the field. The predictor may predict sets of characters which completes a received text input (known as completion), correct received text input (known as correction), or a combination thereof (e.g., completing the text input while correcting previously entered text input).

For example, in the predictor is a program 148 residing in memory 110 of electronic device 100. Accordingly, method 200 includes a predictor for generating a set of characters corresponding to a subsequent candidate input character based on inputted characters. It can be appreciated that while the example embodiments described herein are directed to a predictor program executed by a processor, the predictor can be executed by a virtual keyboard controller.

Method 200 begins at block 210, where the processor receives an input of one or more characters from a virtual keyboard displayed on a touchscreen. As used herein, however, a character can be any alphanumeric character, such as a letter, a number, a symbol, a punctuation mark, and the like. The inputted character can be displayed in an input field (for example, input field 330 further described below in FIGS. 3-9) that displays the character the user inputs using the virtual keyboard.

At block 220, the processor generates one or more sets of characters such as words or phrases, acronyms, names, slang, colloquialisms, abbreviations, or any combination thereof based on the input received in block 210. The set of characters includes, for example, a set of characters that are stored in a dictionary (for example, a word or an acronym) of a memory of the electronic device, a set of characters that were previously inputted by the user (for example, a name or acronym), a set of characters based on a hierarchy or tree structure, a combination thereof, or any set of characters that are selected by a processor based on defined arrangement.

In some embodiments, the processor can use contextual data for generating a set of characters. Contextual data considers the context of characters in the input field. Contextual data can include information about, for example, set of characters previously inputted by the user, grammatical attributes of the characters inputted in the input field (for example, whether a noun or a verb is needed as the next set of characters in a sentence), or any combination thereof. For example, if the set of characters "the" has already been inputted into the display, the processor can use the contextual data to determine that a noun—instead of a verb—will be the next set of characters after "the". Likewise, if the set of characters "Guy Lafleur played in the National Hockey" was inputted, based on the context, the processor can determine the subsequent set of characters is likely "League". Using the contextual data, the processor can also determine whether an inputted character was incorrect. For example, the processor can determine that the inputted character was supposed to be a "w" instead of an "a", given the proximity of these characters on a QWERTY virtual keyboard.

Processor 102 can also include an affix as part of the set of characters, such as an adverb ending, an adjective ending, different verb tenses, and the like, or any other change to make a complete set of characters. Processor 102 can also use the received input to generate affixes, such as plural endings or plural forms.

Any known predictive technique or software can be used to process the received input and the contextual data in generating a set of characters at block 220.

In some example embodiments, the set of characters generated at block 220 can begin with the same character received as input at block 210. For example, if the characters "pl" have been received as input using a virtual keyboard, these characters will be received by the processor as the input. In these embodiments, the set of characters generated at block 220 would all begin with "pl", such as "please" or "plot." There is no limit on the length of a generated set of characters. Regarding affixes, if the user has input the characters "child", for example, the affixes generated at block 220 could include "-ren", to make the set of characters "children", or "-ish", to make the set of characters "childish".

In some example embodiments, the set of characters generated at block 220 can simply include the same characters received as input at block 210. For example, if the received input is an "x," the processor may generate "example" or "xylophone" as the set of characters. Such sets of characters can be generated using the contextual data.

In another example embodiment, if input has not been received or a delimiter (such as a <SPACE>) has been used, the generated set of characters can be placed on subsequent candidate input characters that correspond to the first letter of the generated set of characters.

Next, at block 230, the generated set of characters from block 220 can be ranked. The rankings reflect the likelihood that a candidate set of characters might have been intended by the user, or might be chosen by a user compared to another candidate set of characters.

In some embodiments, contextual data can be included in the ranking at block 230. In some embodiments, the electronic device can be configured to rank nouns or adjectives higher based on the previous inputted set of characters. If the inputted set of characters is suggestive of a noun or adjective, the processor, using the contextual data, can rank the nouns or adjectives corresponding to what the user is typing higher at block 230. In an additional embodiment, sets of characters including adjective affixes (such as "-ish" or "-fur"), phrases, plurals, or combinations thereof can also be ranked. Contextual data can increase the likelihood that the higher ranked generated set of characters is intended by a user. In some embodiments, contextual data can include information about which programs or applications are currently running or being used by a user. For example, if the user is running an email application, then sets of characters associated with that user's email system, such as sets of characters from the user's contact list, can be used to determine the ranking. N-grams, including unigrams, bigrams, trigrams, and the like, can be also used in the ranking of the sets of characters. Alternatively, the geolocation of the electronic device or user can be used in the ranking process. If, for example, the electronic device recognizes that a user is located at his/her office, then sets of characters generally associated with work can be ranked higher in the list. If, on the other hand, the device determines a user is at the beach, then sets of characters generally associated with the beach can be ranked higher in the list.

At block 240, the processor determines which of the set of characters to display based on the ranking. For example, higher ranked sets of characters are more likely to be determined that they should be displayed. A ranker (such as a ranking algorithm, program or firmware) includes a set of instructions that when executed by a processor (for example, main processor 102), can be executed to determine ranking in this regard. In some embodiments, the ranker is a program 148 residing in memory 110 of electronic device 100.

At block 250, the determined set of characters is displayed at a location on the keyboard corresponding to a subsequent candidate input character, predicted as the next character in a word that the user might input. For instance, if a user inputs "pl", the word "please" would be displayed on the key for the letter "e"—the subsequent candidate input character for that word. Similarly, the word "plus" would also be displayed on the key for the letter "u"—another subsequent candidate input character. The subsequent candidate input character can be any alphanumeric character, such as a letter, number, symbol, punctuation mark, and the like.

In some embodiments, the generated set of characters is displayed at or near keys on the virtual keyboard associated with the subsequent candidate input characters. Its placement at or near a key can depend, for instance, on the size of the word or the number of nearby subsequent candidate input characters and the size of their associated set of characters.

The set of characters can be displayed in a manner that will attract the user's attention. In some embodiments, a displayed set of character's appearance can be enhanced or changed in a way that makes the set more readily visible to the user. For example, displayed sets of characters can be displayed with backlighting, highlighting, underlining, bolding, italicizing, using combinations thereof, or in any other way for making the displayed set of characters more visible.

When identifying the set of characters for display at block 240, the processor can limit the displayed sets of characters to the top few or choose among the higher ranked sets of characters. For example, if two sets of characters are both ranked high, and these sets of characters would otherwise be displayed at the same key, the electronic device could be configured to display only the highest ranked generated set of characters. In other embodiments, both sets of characters could be displayed at or around the same key, or one set of characters is displayed at one key while the second set of characters is displayed at another key. In some example embodiments, the processor can take into account the display size to limit the number of generated sets of characters.

In some embodiments, the ranking could be used to choose between two or more sets of characters that, when displayed on adjacent subsequent candidate input characters, would overlap with each other (e.g., because of their respective lengths). In such a scenario, the electronic device could be configured to display the higher ranked set of characters on the keyboard. For example, if the set of characters "establishment" is ranked first in a list generated at block 240 after the letter "E" is inputted, "establishment" could be displayed at the "S" key. When displayed on a virtual keyboard, however, its length might occupy some space on the "A" key and the "D" key, potentially blocking a set of characters that would be displayed on or around those keys. At block 240, it could be determined that "establishment" would be displayed fully, and no other set of characters would be placed at the "A" or "D" keys ahead of the first ranked set of characters "establishment." An alternative to displaying only the top ranked set of characters would be to use abbreviations or recognized shortened forms of the set of characters, effectively permitting a long set of characters to be displayed within or mostly within the boundaries of a single key simultaneously with other sets of characters on adjacent keys of a virtual keyboard.

FIGS. 3A-9 illustrate a series of example front views of the touchscreen 118 having a virtual keyboard 320, consistent with example embodiments disclosed herein. Starting with FIG. 3A, touchscreen 118 includes a virtual keyboard 320 that is touch-sensitive. The position of the virtual keyboard 320 is variable such that virtual keyboard 320 can be placed at any location on touchscreen 118. Touchscreen 118 could be configured to detect the location and possibly pressure of one or more objects at the same time. Touchscreen 118 includes two areas: (1) an input field 330 that displays characters after a user has inputted those characters and (2) the virtual keyboard 320 that receives the input from the user. As described throughout this disclosure, the virtual keyboard displays a set of characters at a location on the keyboard corresponding to a subsequent candidate input character that might be received as input from the user.

The examples and embodiments illustrated in FIGS. 3-9 can be implemented with any set of characters, such as words, phrases, acronyms, names, slang, colloquialisms, abbreviations, or any combination thereof.

Figure 3A:
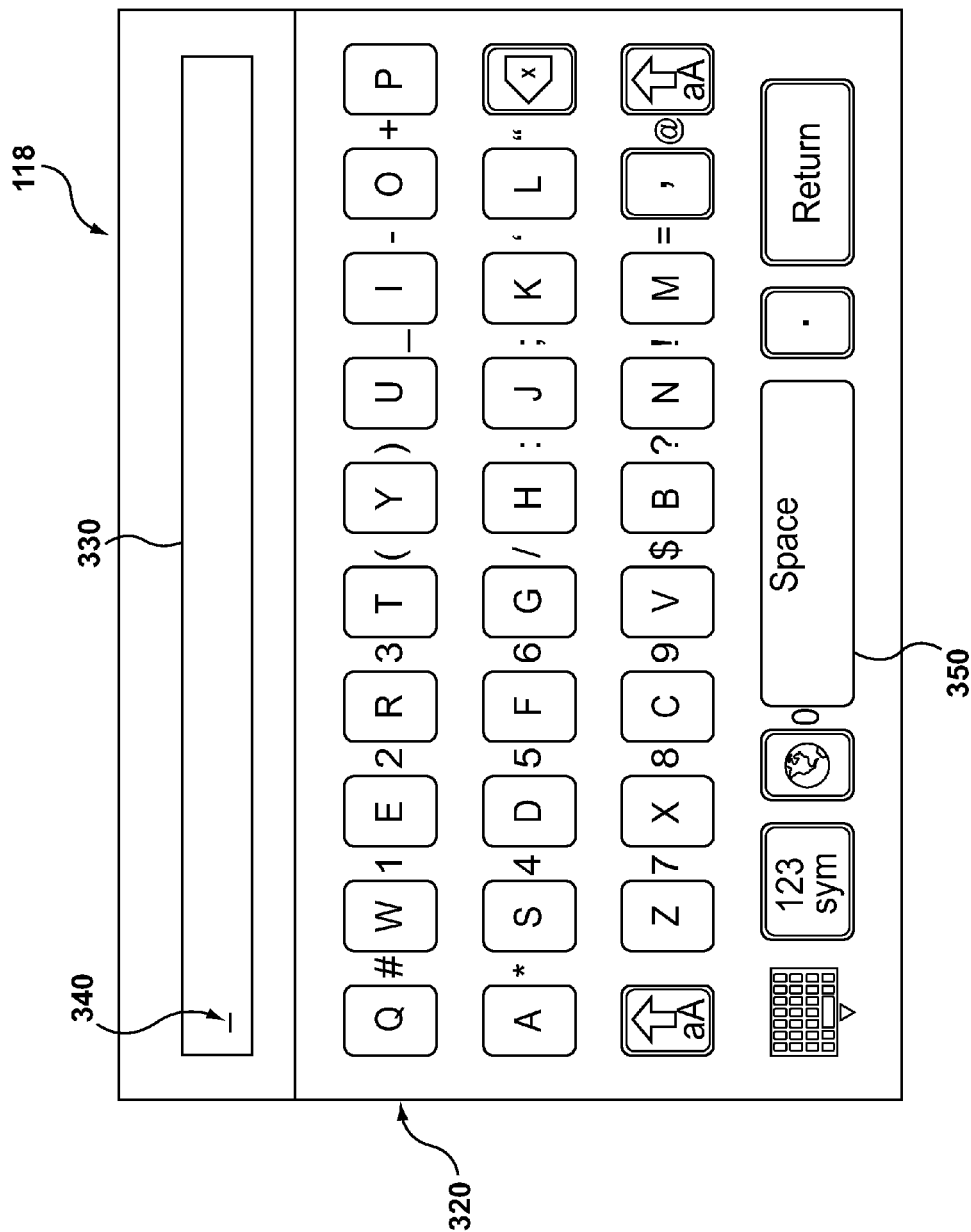
FIGS. 3A, 3B, 3C, and 3D show example front views of a touchscreen, consistent with embodiments disclosed herein.

As shown in FIG. 3A-118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 350 as well as other keys that can provide different inputs, such as punctuation, letters, numbers, enter or return keys, and function keys. While virtual keyboard 320 is shown as having a square shape, it can have any other shape (such as an arch).

As shown in FIG. 3A, touch screen 118 displays input field 330, which displays the characters the user inputs using virtual keyboard 320. Input field 330 includes a cursor 340, which can be an underscore as shown) or any other shape, such as a vertical line. Cursor 340 represents the character space where a next inputted character, selected character, or selected set of characters will be inserted.

Figure 3B:
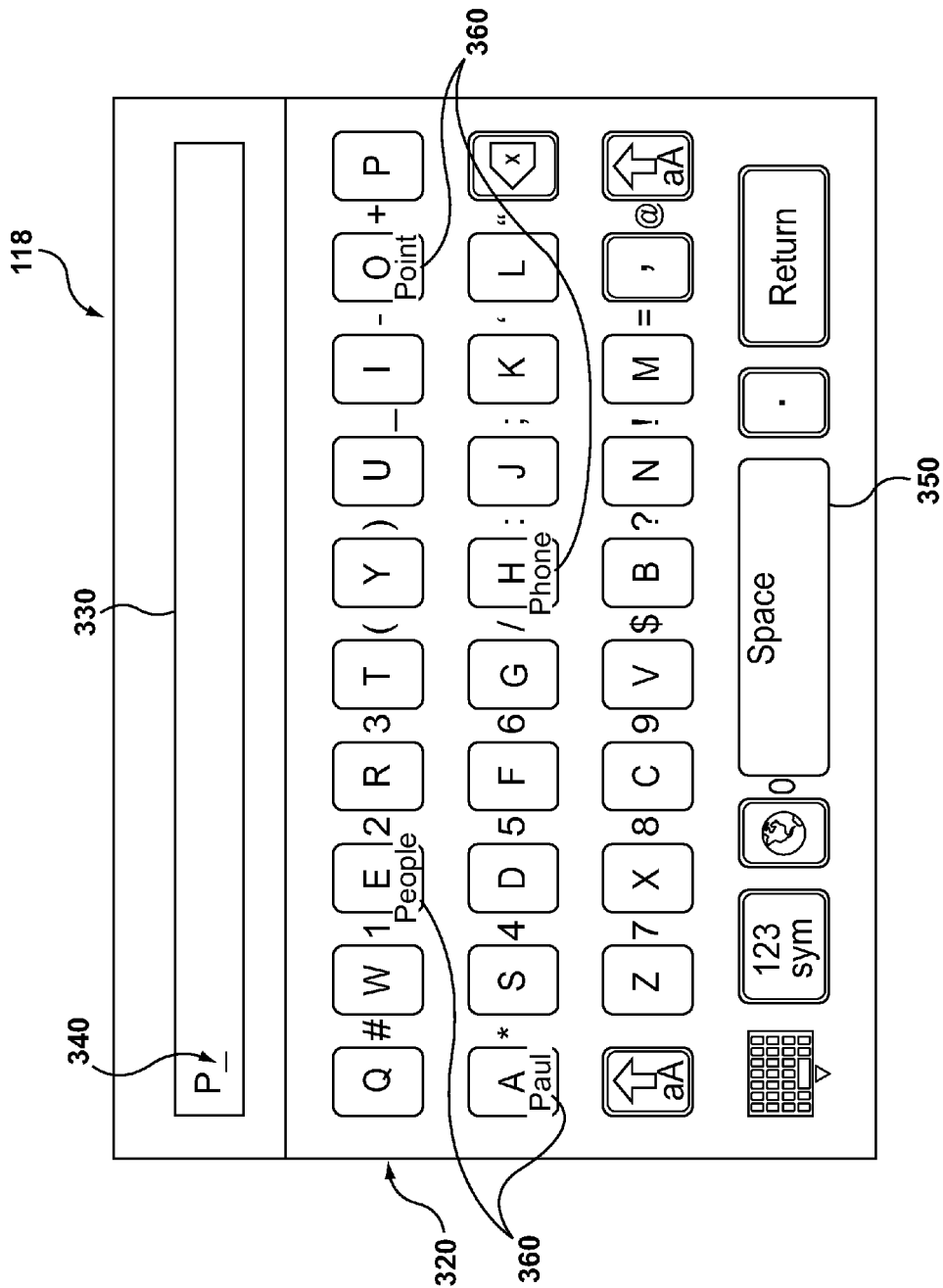

As shown in FIG. 3B, when a user inputs a character (in this example, "P"), this character is displayed in input field 330 and cursor 340 moves to the character space where the next inputted character or word will be inserted. After the character is inputted, a predictor (such as, a predictive algorithm or a circuit) can generate sets of characters 360 (for this embodiment) that all begin with the character "P", or characters if more than one character is input. The generated sets of characters are displayed at a location on the keyboard corresponding to a subsequent candidate input character that might be received as input from the user. As mentioned, generated set of characters 360 can be displayed at or near the key corresponding to the subsequent candidate input characters (for example, under the respective A, E, H, and 0 keys of the virtual keyboard 320). Indeed, slightly shifting the display location of the generated set of characters can address overcrowding of subsequent candidate input characters, effectively permitting more sets of characters to be displayed.

In the example shown in FIG. 3B, "P" is received as input and a predictor generates several sets of characters 360, which are displayed at keys corresponding to each generated set of characters' subsequent candidate input character. As shown in FIG. 3B, "People" is placed at the "E" key because the next letter after "P" of "People" is "E"; "Paul" will be placed at the "A" key because the next letter after "P" of "Paul" is "A"; "Phone" will be placed at the "H" key because the next letter after "P" of "Phone" is "H"; and so on. It should be noted that any of the letters in the set of characters can be upper case or lower case.

Figure 3C:
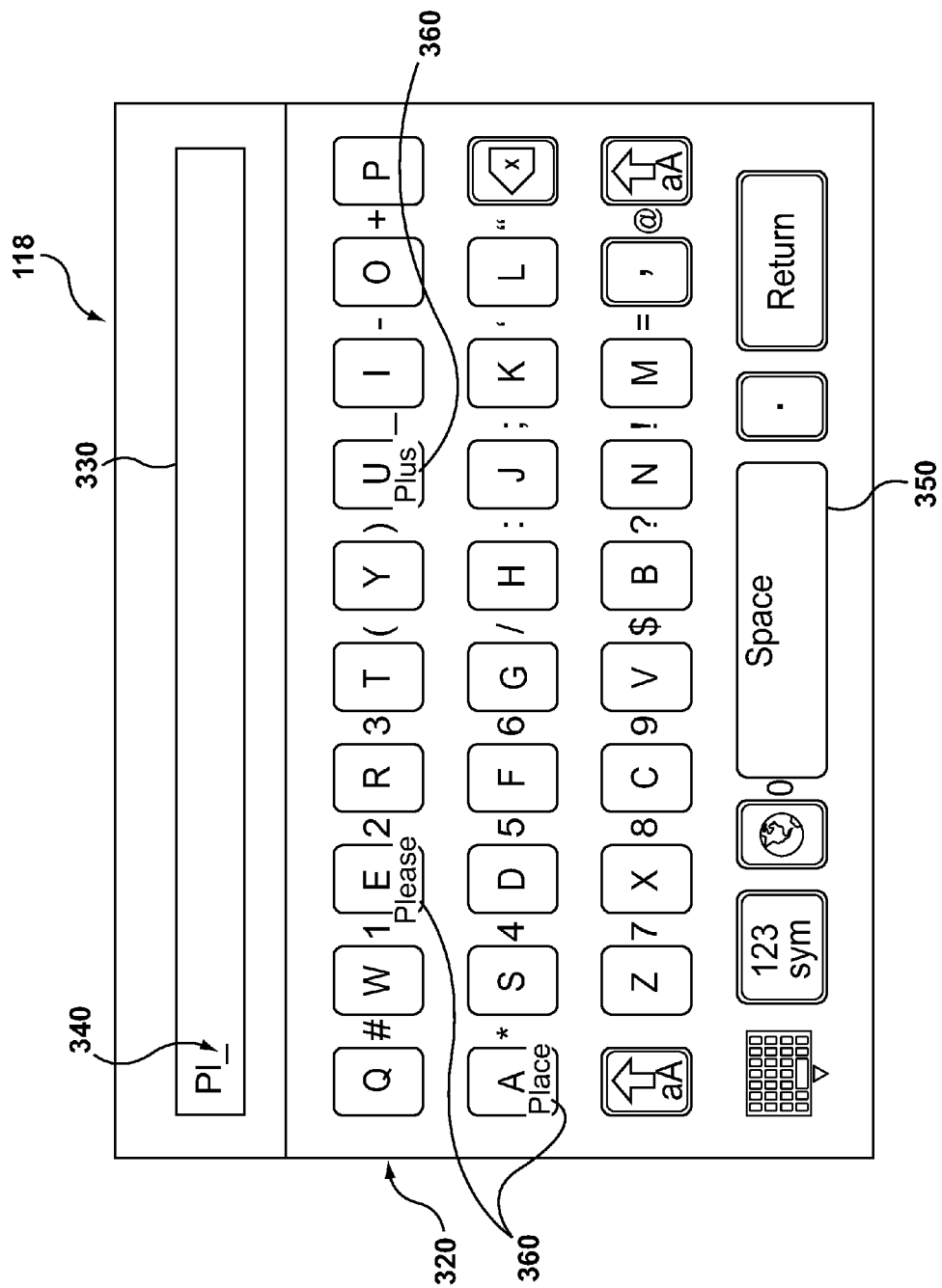

In the embodiment shown in FIG. 3C, "L" is the next input received by the touchscreen, and a predictor determines several generated sets of characters 360, which are displayed at a key corresponding to subsequent candidate input characters (for example, under the respective A, E, and U keys of the virtual keyboard 320), for the current position of cursor 340, which is in the third character position, as shown in input field 330. In another embodiment, a generated set of characters 360 can be presented such as to include the subsequent candidate input character. For example, the set of characters "Please" can be displayed so that the characters "Pl" are displayed before the "E" character on the "E" key, and the characters "ase" can be placed after the "E" character on the "E" key. Further, in this or other embodiments, the displayed "E" can be presented in a manner that differs from the "Pl" and "ase", thereby enabling the user to still recognize it as the "E" key while also making it readily visible so that the user can either input the generated set of characters "Please" or input the character "E". The "E" can be capitalized or in lowercase. In other embodiments, an affix can be displayed at the key. Using the example of the set of characters "Please" above, the "ase" could be displayed at the "E" key so the set of characters fragment "-ease" or "-Ease" would appear.

If the user inputs a generated set of characters, that set of characters is placed in input field 330. This can be seen in FIG. 3D, where the user has inputted generated set of characters "Please," resulting in its placement in the input field. A space is inserted after the set of characters if the user wants to input a new set of characters. A user could input a generated set of characters in various ways, including in a way that differs from a manner of inputting a character key. For example, to input a generated set of characters, a user could use a finger or stylus to swipe the generated set of characters. As used herein, swiping includes swiping the set of characters itself or swiping or touching near the set of characters. For the latter embodiment, the device can detect a swipe or touch near a set of characters, be it a generated set of characters or a predicted set of characters (to be described below), and through the use of a predictor, determine the set of characters the user intended to input. In another embodiment, the user could press a key for a predetermined period of time, such as a long press. That key can be, for example, the key corresponding to the subsequent candidate input character of the set of characters. So, if the set of characters "Please" is intended to be inputted instead of "E", the electronic device 100 can be configured to require that the "E" key be pressed for a predetermined period of time to trigger the input of "Please".

Figure 3D:
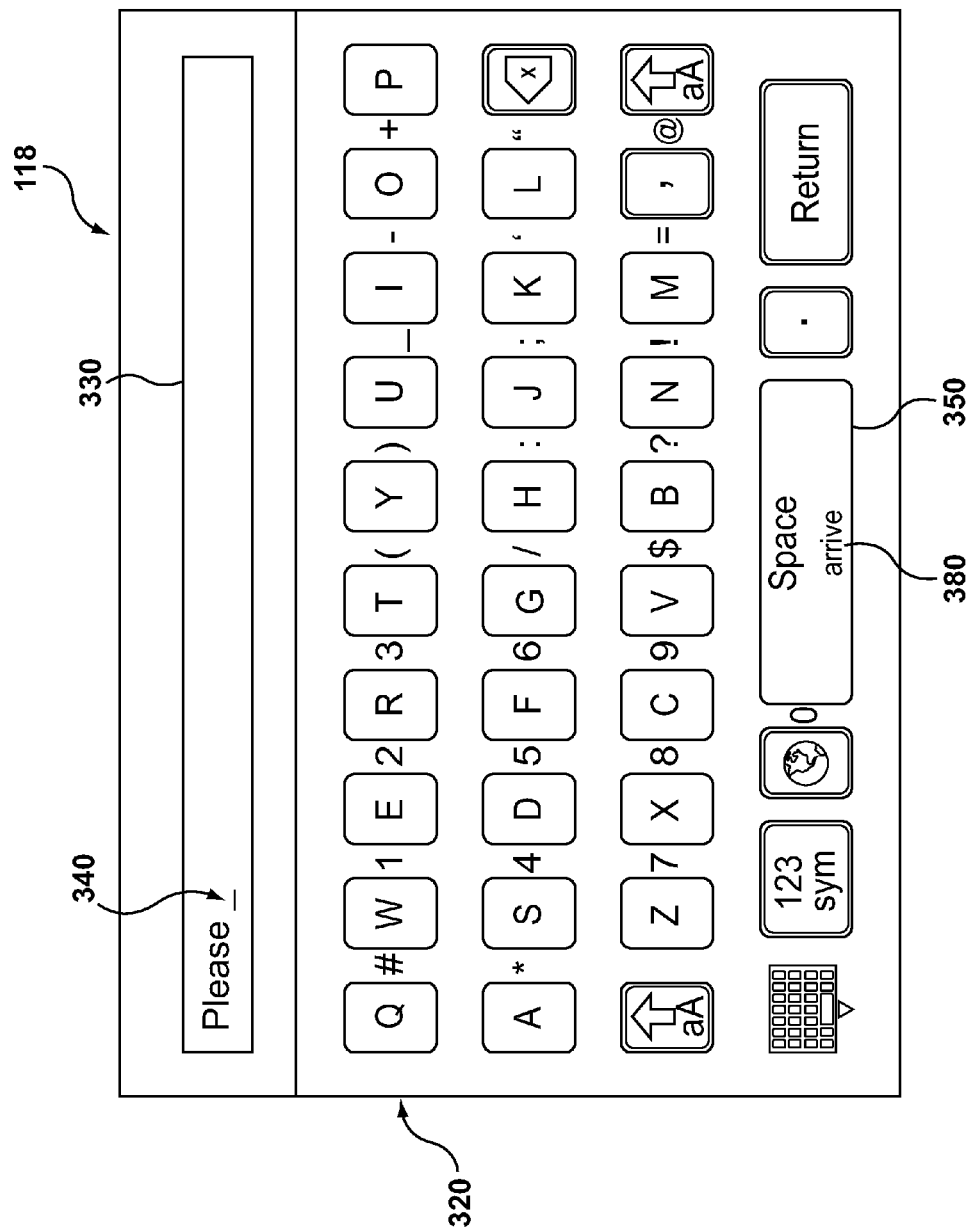

After a generated set of characters 360 has been determined, as shown in FIG. 3D, a predicted set of characters 380 can be displayed, shown here at space key 350. Predicted set of characters 380 can differ from generated set of characters 360 (as shown in FIGS. 3A-3C) and is the system's attempt to predict the next set of characters a user might be contemplating. A predictor is used to determine predicted set of characters 380. As with displayed generated set of characters 360, predicted set of characters 380 can be received as input in any number of ways, including receiving a swiping of the predicted set of characters with a finger or stylus or receiving a pressing of a key (such as the space key or another designated key) for a predetermined period of time (long press).

Figure 4A:
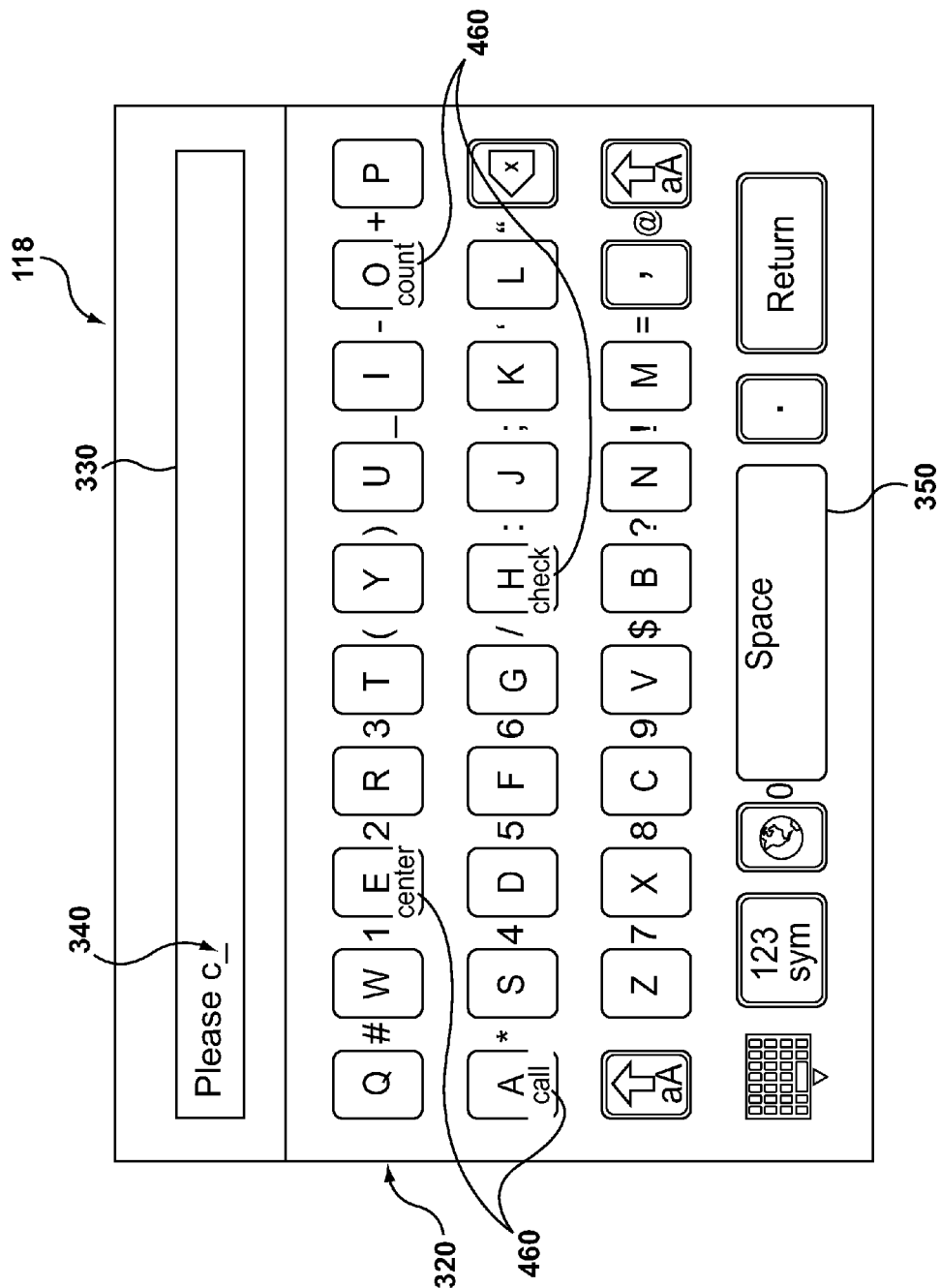
FIGS. 4A and 4B show example front views of a touchscreen, consistent with embodiments disclosed herein.
Figure 4B:
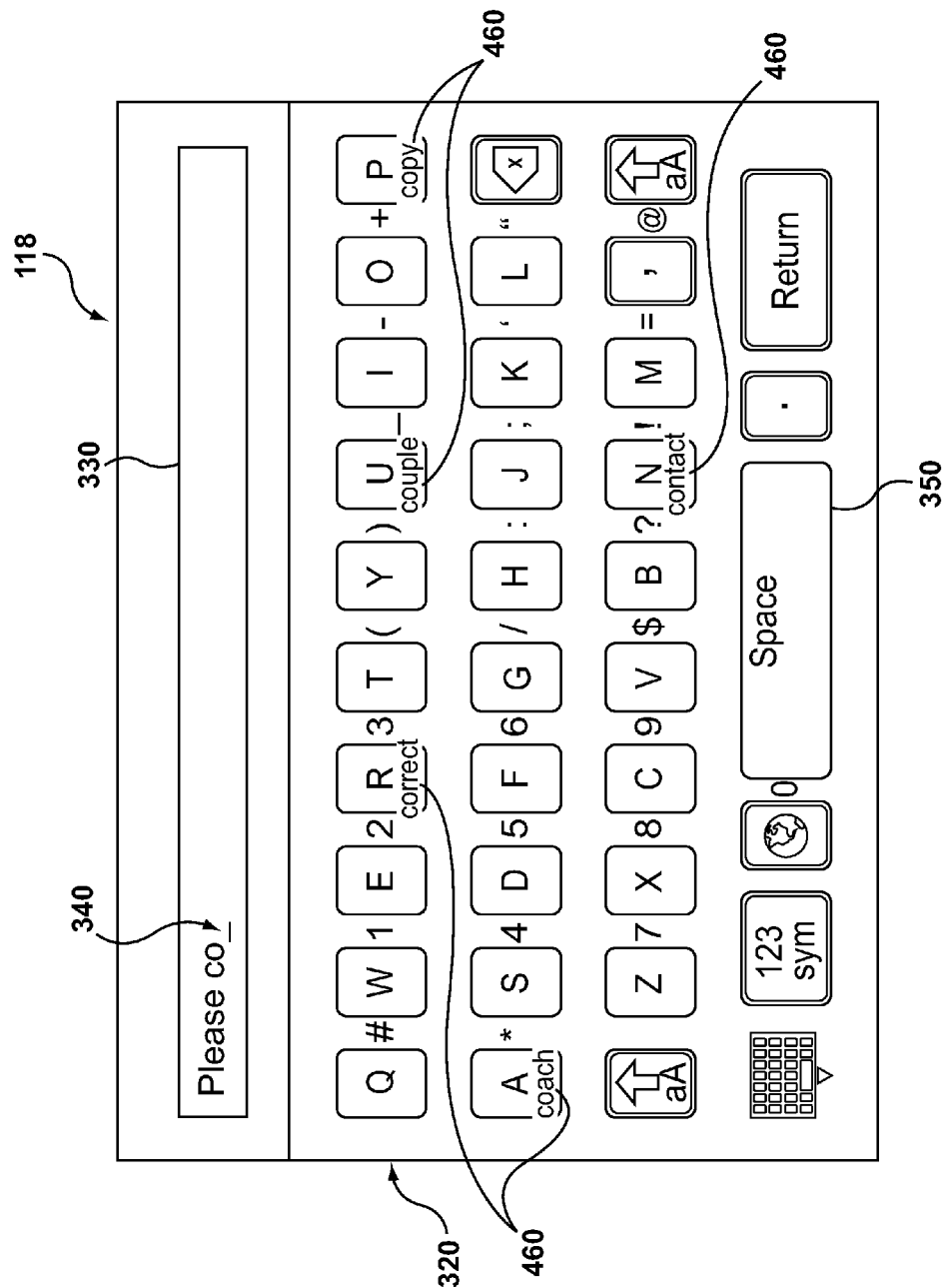

In FIG. 4A, electronic device 100 receives "C" as input from virtual keyboard 320. Again, a predictor determines generated set of characters 460 based in part on the received input. In FIG. 4B, electronic device 100 receives "O" as input from the virtual keyboard and outputs the "O" in input field 330. As shown in FIG. 4A, the set of characters "count" was displayed at the "O" key after the input of the "C" character was received. Since the "O" key was pressed in a manner to only input the "O" character, as shown in FIG. 4B, an "O" is displayed as second character of the currently inputted set of characters, and the set of characters "count" is not inputted by the user. Alternatively, if a user wanted to input the generated set of characters "count," the user can input the "O" key in FIG. 4A in a manner different from a manner of inputting the "O" key, such as by swiping the set of characters "count" or by a long press on the "O" key, as opposed to tapping. Returning to FIG. 4B, after the "O" is inputted, generated sets of characters 460 are displayed at the keys corresponding to subsequent candidate input characters, as shown in FIG. 4B.

Figure 5:
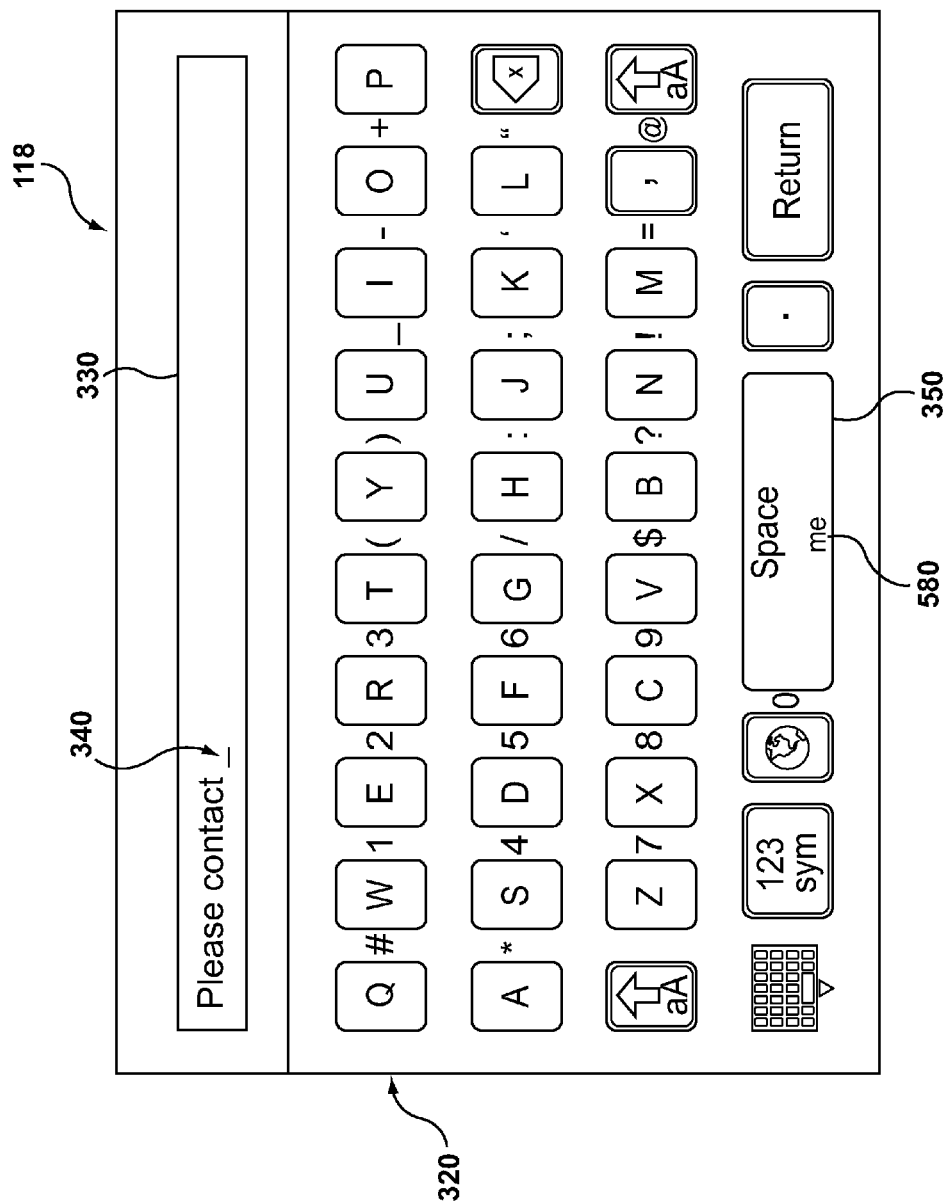
FIG. 5 shows an example front view of a touchscreen, consistent with embodiments disclosed herein.

FIG. 5 shows input field 330 displaying the set of characters "contact" followed by a space. In that instance, the user inputted the generated set of characters "contact" 460 as was shown in FIG. 4B at the "N" key. Referring back to FIG. 5, a <SPACE> character is now automatically inserted after the generated word in the input field. Predicted word "me" 580 is now displayed on space key 350.

Figure 6A:
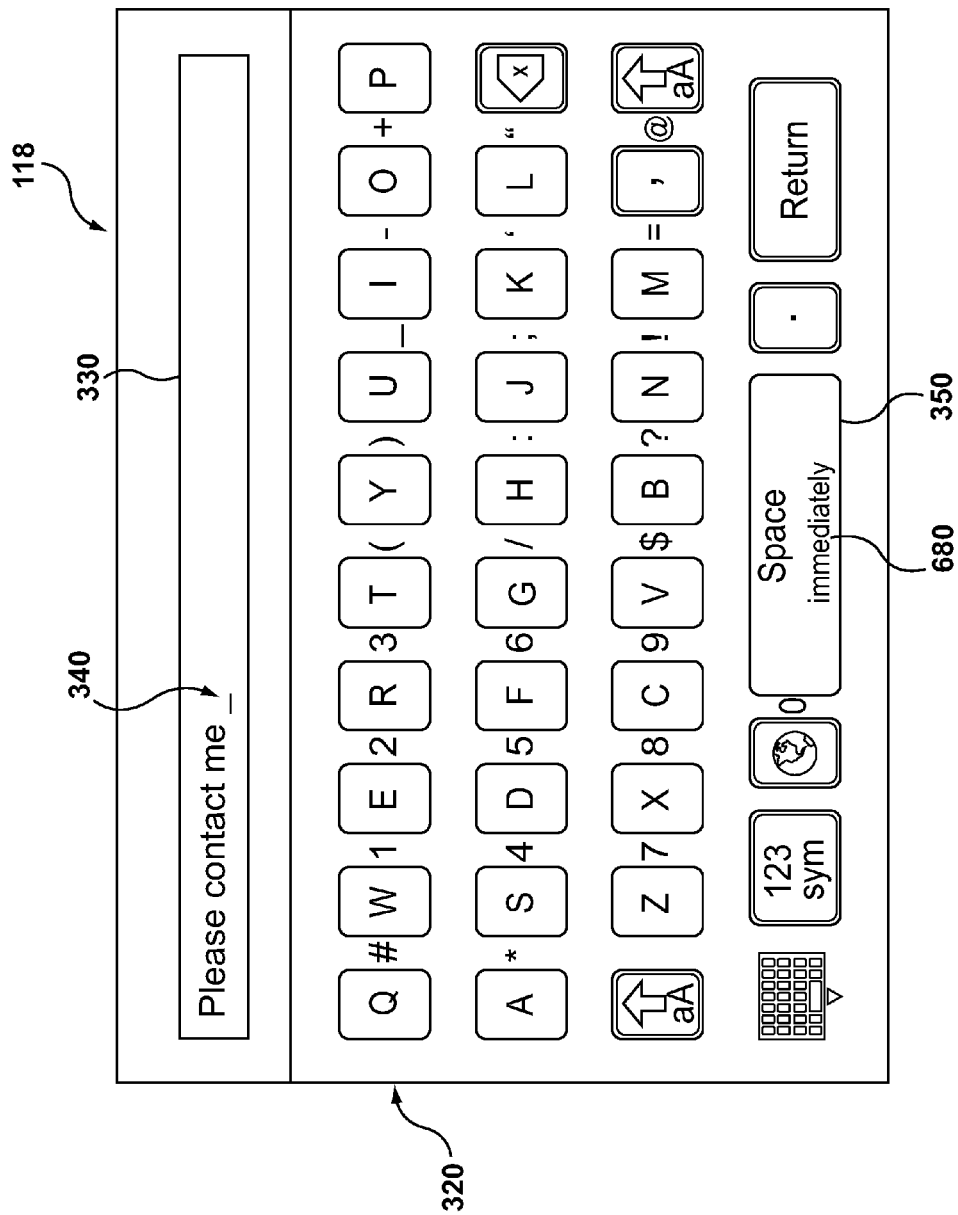
FIGS. 6A, 6B, and 6C show example front views of a touchscreen, consistent with embodiments disclosed herein.

If the predicted word "me" 580 is received as input, the word "me" 580 is then displayed in input field 330 followed by a space as shown in FIG. 6A, which then shows predicted word 680 "immediately" displayed on space key 350. The predicted word is presented after a completed word and space have been displayed in input field 330.

Figure 6B:
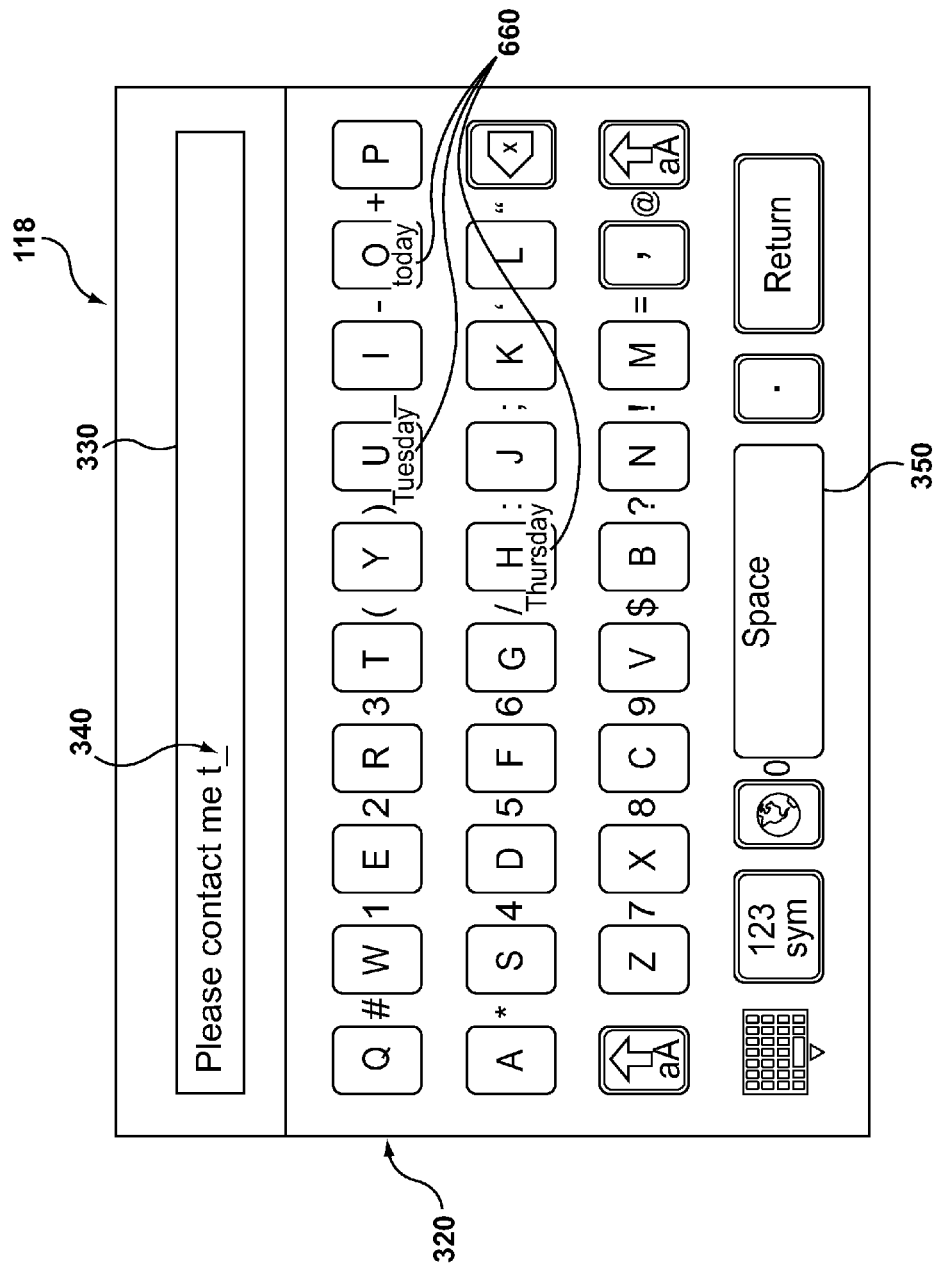
Figure 6C:
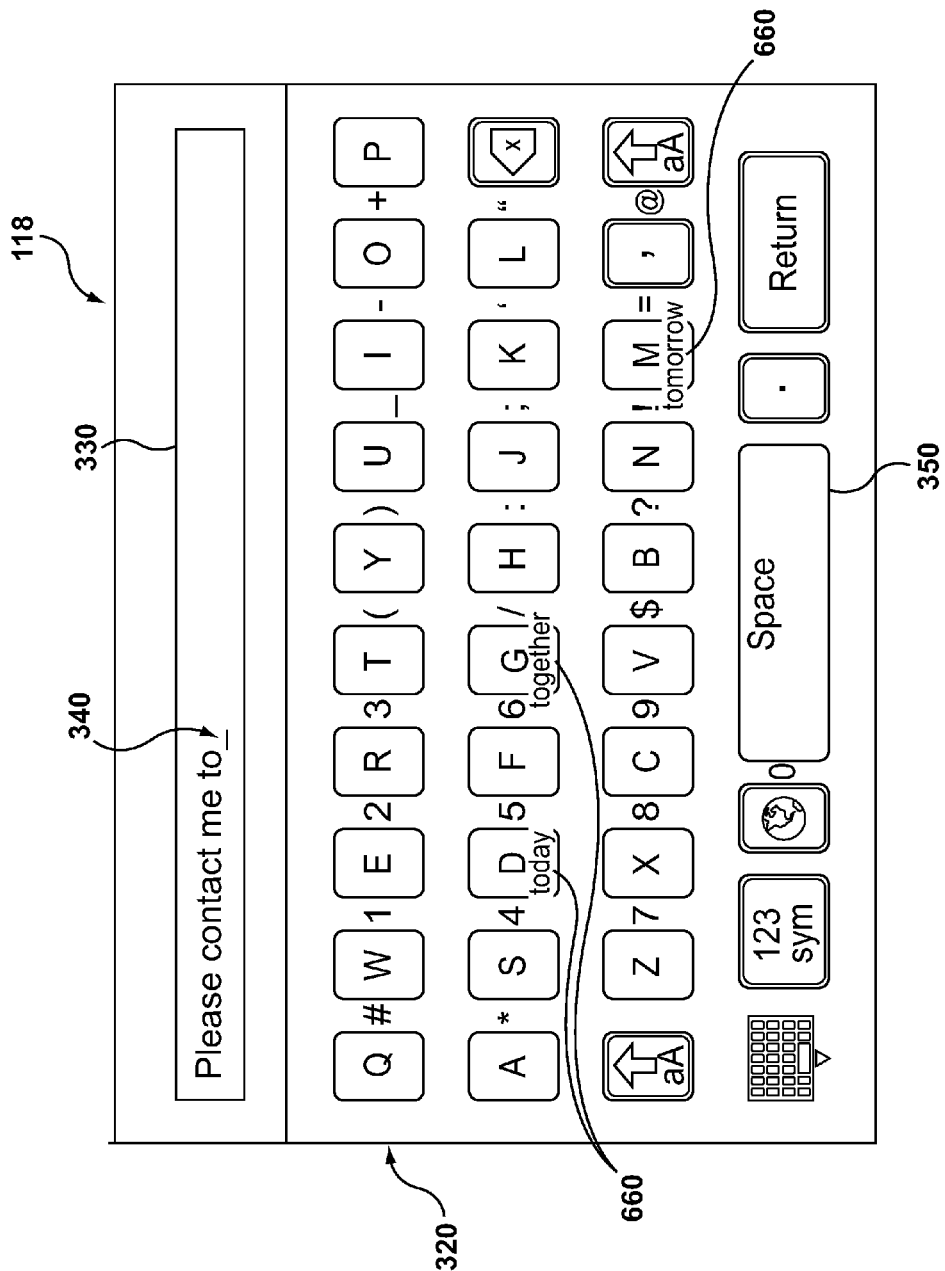

FIG. 6B shows an example where touchscreen 118 has received the "T" character as input after the user has pressed the "T" key. In this scenario, touchscreen 118 displays a "t" in input field 330. Generated sets of characters 660 (for example, "Tuesday," "today," and "Thursday") are displayed at the keys of the subsequent candidate input characters. FIG. 6C shows an example where electronic device 100 has received the "o" character as input after the user presses the "O" key instead of inputting generated set of characters 660 "today" as was shown in FIG. 6B. Thus, "o" is now displayed in input field 330.

Figure 7:
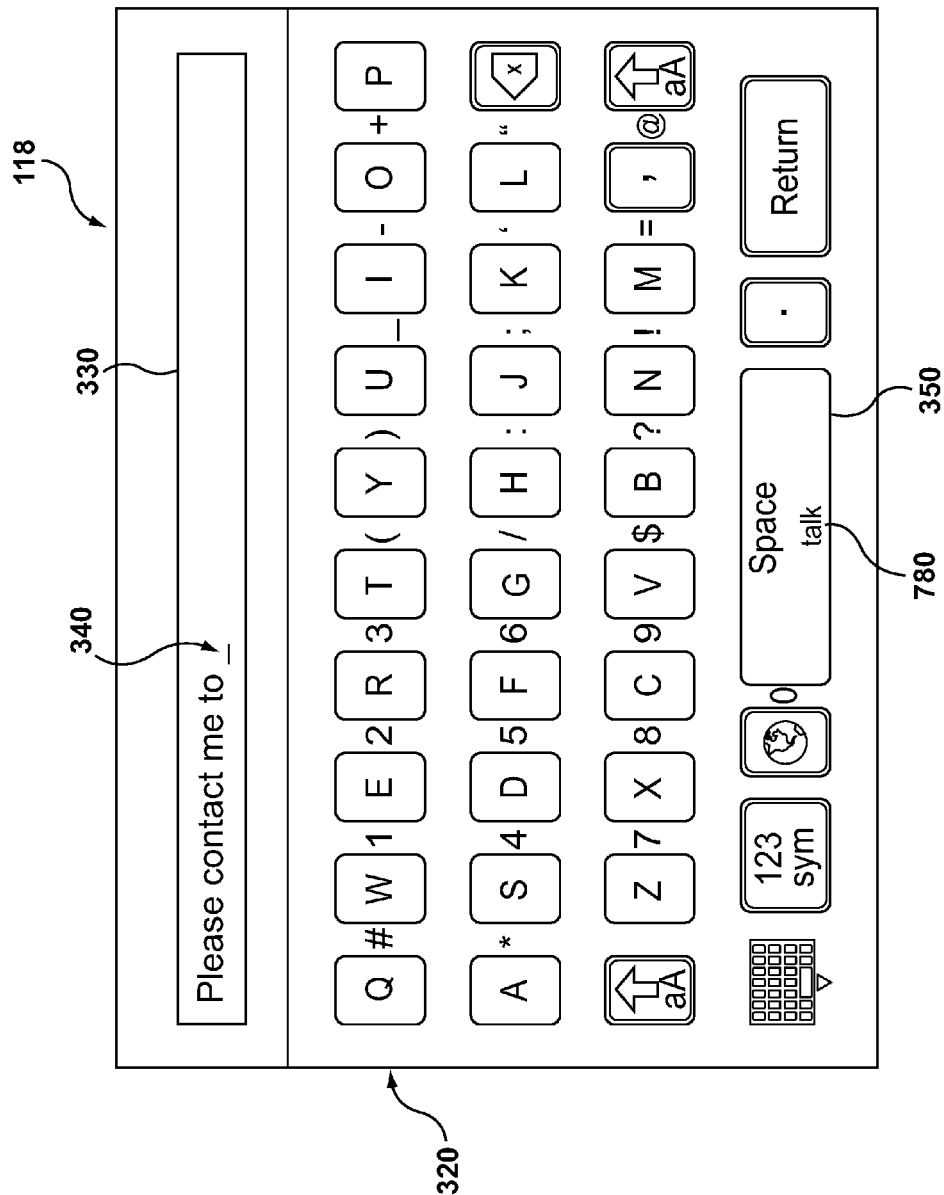
FIG. 7 shows an example front view of a touchscreen, consistent with embodiments disclosed herein.

FIG. 7 shows an example where touchscreen 118 has received the <SPACE> character as input after the user selects the space key. In this scenario, touchscreen 118 inserts a <SPACE> character, and then displays predicted set of characters "talk" 780 at space key 350.

Figure 8A:
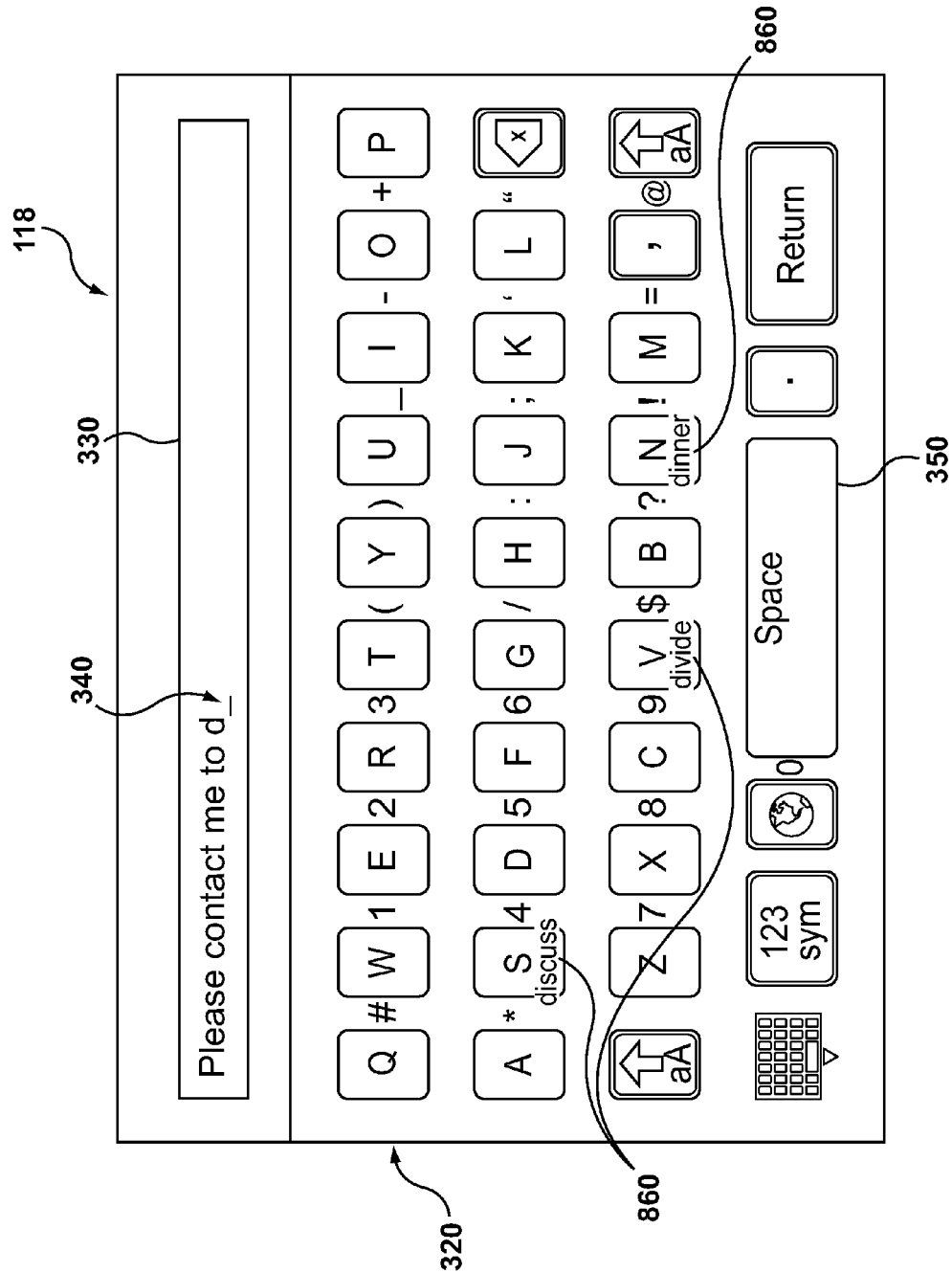
FIGS. 8A and 8B show example front views of a touchscreen, consistent with embodiments disclosed herein.

FIG. 8A shows an example where touchscreen 118 has received the "d" character as input after the user presses the "D" key. In this scenario, touchscreen 118 displays a "d" in the input field 330 and displays generated sets of characters "discuss," "divide," and "dinner" 860 on keys corresponding to subsequent candidate input characters. In this example embodiment, while the character "i" was never received as input, the electronic device 100 determined that the generated sets of characters "discuss," "divide," and "dinner" 860 were the sets of characters to be displayed on touchscreen. In this embodiment, because each of these sets of characters has "i" as its second letter, touchscreen 118 displayed generated sets of characters using a further subsequent letter in the set of characters (for example, "discuss" under the "S" key, "divide" under the "V" key, and "dinner" under the "N" key). In other embodiments, generated sets of characters "discuss," "divide," and "dinner" 860 can be displayed at or near the "I" key.

Figure 8B:
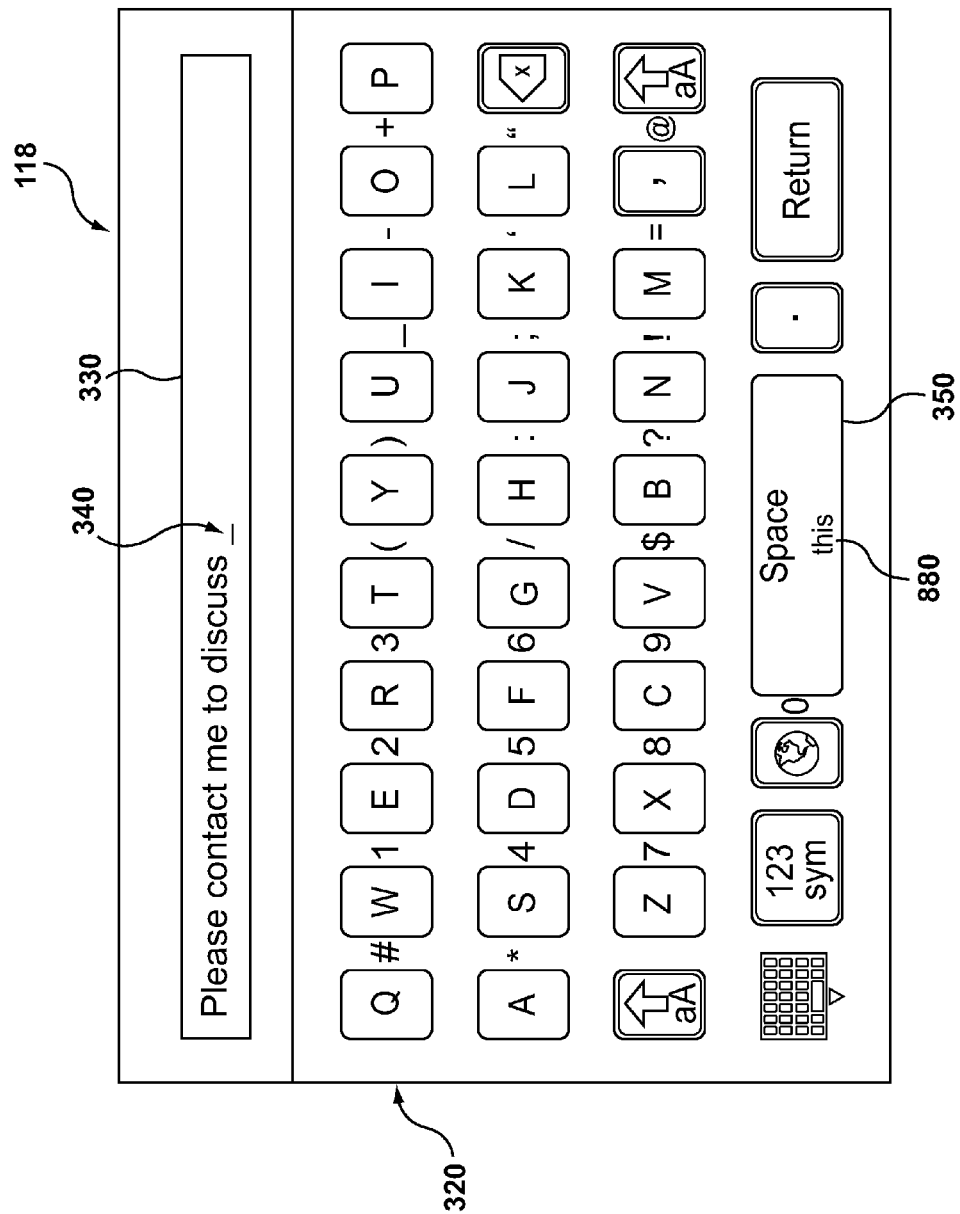

FIG. 8B shows an example where touchscreen 118 has received the set of characters "discuss" as input after the user chooses generated set of characters "discuss" 860. In this example, touchscreen 118 displays predicted set of characters "this" 880 at space key 350.

Figure 9:
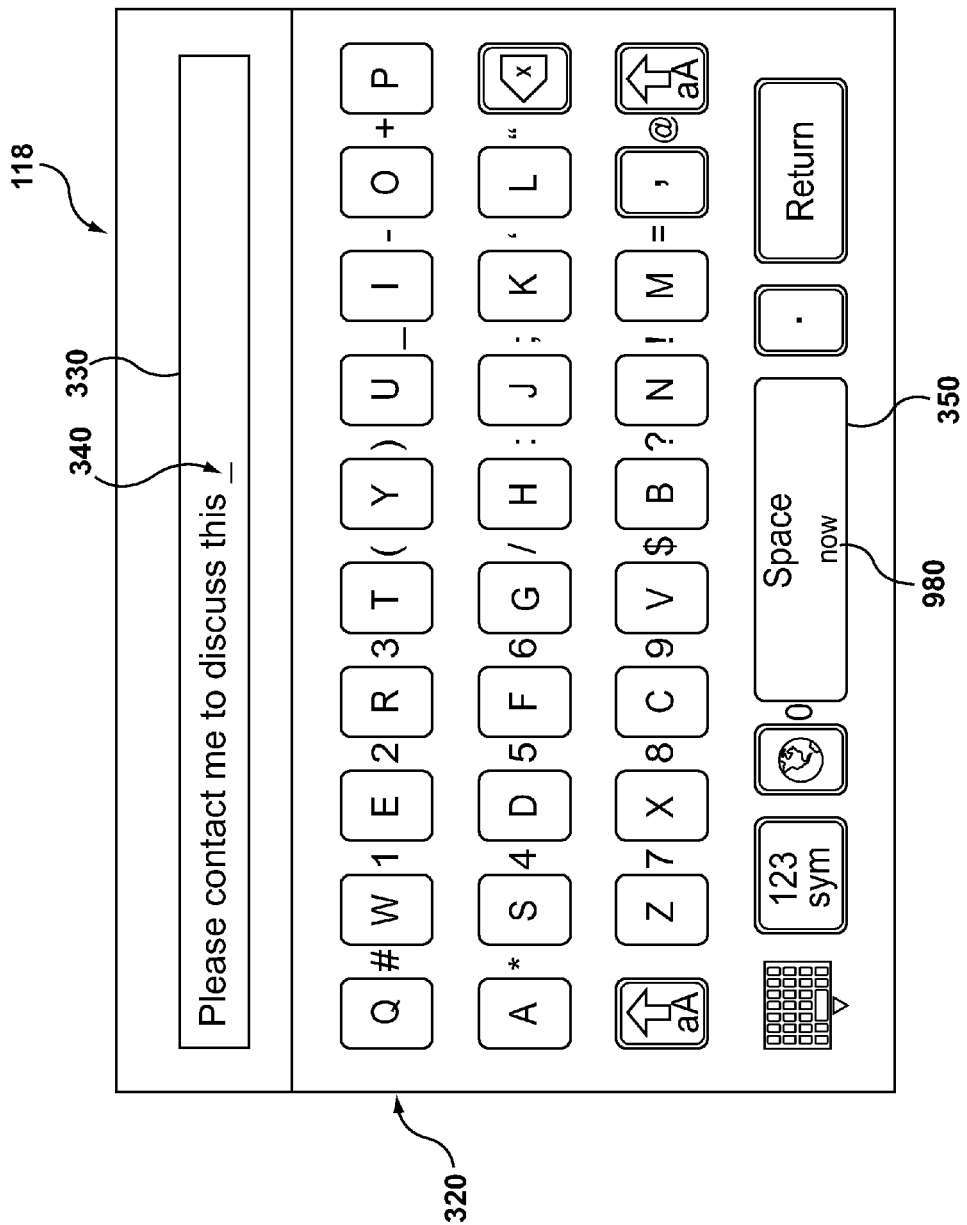
FIG. 9 shows an example front view of a touchscreen, consistent with embodiments disclosed herein.

FIG. 9 shows an example where touchscreen 118 receives the "this" set of characters as input after user selects "this" as a desired predicted set of characters 880. In this example, touchscreen 118 displays predicted set of characters "now" 980 at space key 350.

Figure 10:
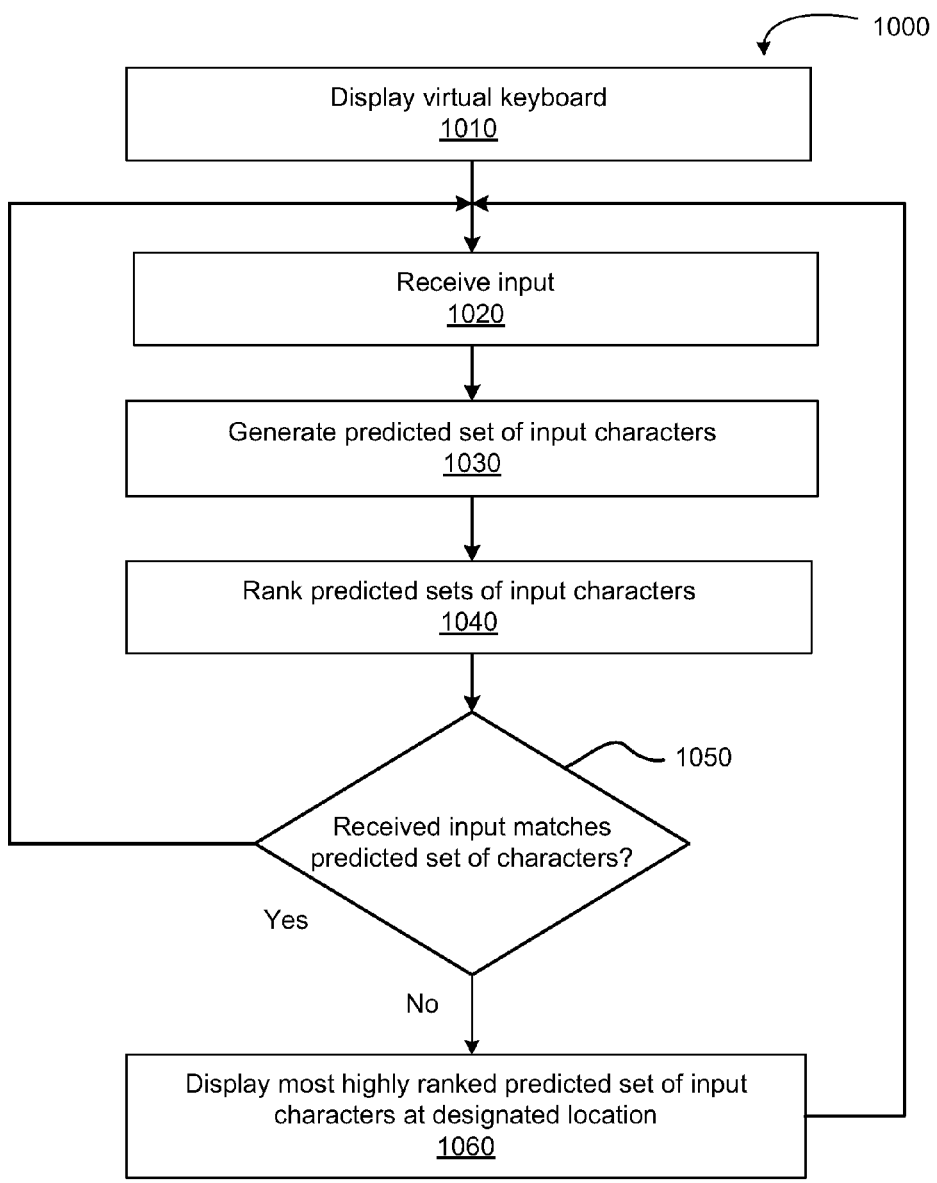
FIG. 10 is a flowchart illustrating an example method for providing corrective word prediction, consistent with embodiments disclosed herein.

Touchscreen 118 can also receive punctuation as input at any time during the typing of a message. If a user decides to use punctuation after inputting either a generated set of characters or a predicted set of characters, the <SPACE> character (for example, the <SPACE> character prior to cursor 940 of FIG. 9) is deleted and the inputted punctuation is inserted, Corrective Word Prediction FIG. 10 is a flowchart of a method 1000 for providing corrective word prediction in a virtual keyboard rendered and displayed on a display of an electronic device 100 in accordance with one example embodiment of the present disclosure. The method 1000 may be carried out, at least in part, by firmware or software executed by the processor 102. Coding of software for carrying out such a method 1000 is within the scope of a person of ordinary skill in the art provided in the present disclosure. The method 1000 may contain additional or fewer processes than shown and/or described, and may be performed in a different order. Computer-readable code executable by the processor 102 to perform the method 1000 may be stored in a computer-readable medium such as the memory 110.

Figure 11A:
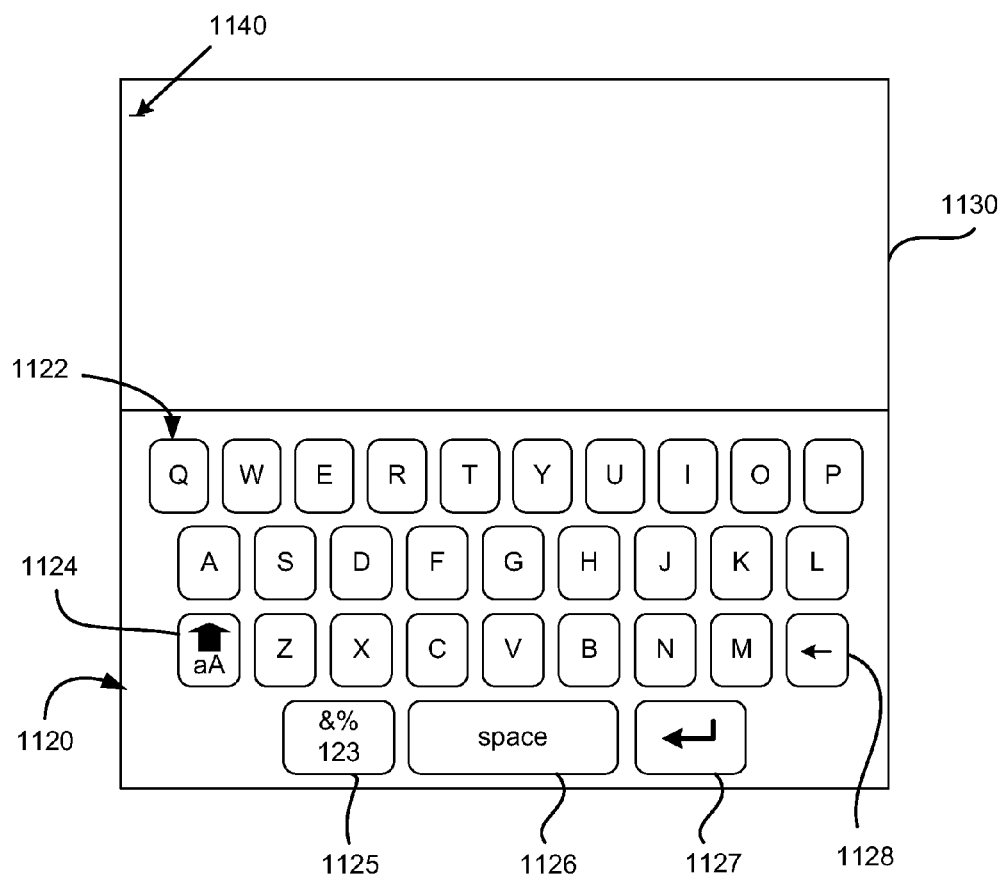
FIGS. 11A-11E show example front views of a user interface screen including a virtual keyboard displayed on a touchscreen illustrating corrective word prediction consistent with one embodiment disclosed herein.

At 1010, a virtual keyboard such as the virtual keyboard 1120 shown in FIG. 11A is rendered and displayed on the touchscreen 118. The virtual keyboard 1120 may be displayed automatically when an input field of a text entry mode is displayed, or may be called or invoked, for example, in response to corresponding input (such as activation of a keyboard button or icon). The virtual keyboard 1120 includes a plurality of keys including a plurality of character keys 1122 as previously described. Each key in the plurality of character keys 1122 corresponds to a character in an input character set. The input character set, in at least some examples, is an English alphabetic or alphanumeric character set. The plurality of character keys are arranged in a familiar QWERTY layout as shown in the example of FIG. 11A, but may be arranged in another suitable format in other examples.

The virtual keyboard 1120, in the shown example, is displayed below an input field 1130 for displaying characters input using the virtual keyboard 1120 and predicted text selected in response to received input. The input field 1130 includes a cursor (also known as a caret) 1140 which can be a horizontal line (as shown) or other suitable shape, such as an underscore as mentioned previously. The virtual keyboard 1120 also includes non-character keys such as a "Shift" key 1124, a "Symbol" key 1125 with the label "&%123" in the shown example, a <SPACE> key 1126, an "Enter" key 1127 and a "Backspace" key 1128.

At 1020, the processor 102 receives input such as a character from the virtual keyboard 1120 displayed on the touchscreen 118. As used herein, a character can be any alphanumeric character, such as a letter, a number, a symbol, a punctuation mark, and the like. The received input, such as an input character, is typically displayed in the input field 1130. The input field 1130 is used to display characters input using the virtual keyboard 1120 and characters input by selecting a predicted set of characters as input. The processor 102 may alternatively receive as an input from the user a backspace command which deletes the previous character in the current word in the input field 1130. As noted above, the current word is the word within the input field 1130 in which the cursor 1140 is currently located.

At 1030, the predictor generates one or more predicted sets of characters (e.g., word) which the user may be contemplating based at least in part on the received input for a current position of the cursor 1140 within the current word (or other set of characters). In at least some examples, the generating occurs automatically in response to the received input in 1020. In other examples, the generating occurs in response to detecting designated input for autocomplete or autocorrect operations.

The current word is the word within the input field 1130 in which the cursor 1140 is currently located. As noted above, words are separated by a delimiter character, such as a <SPACE> character. The predicted sets of characters may include words or phrases, acronyms, names, slang, colloquialisms, abbreviations, or any combination thereof based on the input received. The predicted set of characters may be generated by the predictor from a dictionary stored in a memory of the electronic device 100, a set of characters that were previously input (for example, a name or acronym), a set of characters based on a hierarchy or tree structure, a combination thereof, or any set of characters that are selected by the processor 102 based on defined arrangement.

At 1040, the processor 102 determines a rank of each predicted set of characters when more than one predicted set of characters is generated. The rank reflects the likelihood that a predicted set of characters was intended by the user, or may be chosen by a user compared to another predicted set of characters. A ranker (such as a ranking algorithm, program or firmware) includes a set of instructions that when executed by a processor (for example, main processor 102), can be executed to determine ranking in this regard. In some embodiments, the ranker is a program 146 residing in memory 110 of electronic device 100. Contextual data may be included in the ranking as described above.

At 1050, the processor 102 determines whether the received input matches one or more predicted sets of characters.

At 1060, the mostly highly ranked predicted set of characters is displayed at a designated location when the received input does not match one of the predicted set of characters. When the received input does not match one of the predicted set of characters, the received input may contain an error caused by a targeting error or spelling error. The predicted sets of characters represent candidate word corrections. It will be appreciated that the lack of a match between the received input and one of the predicted set of characters is not determinative of an error in the received input, only that the received text is not known to the predictor. The received text may be a new word or string unknown to the predictor or an intentional misspelling (e.g., slang).

In some examples, the designated location is a location associated with a key of the virtual keyboard of the display which corresponds to a last input character by the user. For example, if a user inputs "teech" and the word "teach" is the mostly highly ranked predicted set of characters, the word "teach" is displayed at the location of the "H" key. The last input character can be any alphanumeric character, such as a letter, number, symbol, punctuation mark, and the like. In other examples, the designated location is a location on the virtual keyboard 1120 corresponding to the <SPACE> key 1126.

In some examples, the predicted set of characters is displayed on, at or near keys on the virtual keyboard 1120 associated with the last input character. Its placement at or near a key can depend, for instance, on the size of the predicted set of characters.

The predicted set of characters can be displayed in a manner that will attract the user's attention. In some embodiments, a displayed set of character's appearance can be enhanced or changed in a way that makes the set more readily visible to the user. For example, displayed sets of characters can be displayed with backlighting, highlighting, underlining, bolding, italicizing, using combinations thereof, or in any other way for making the displayed set of characters more visible.

The method 1000 provides a method for corrective text prediction which facilitates the correction of previously entered text. When the received input does not match one of the predicted set of characters, the received input may contain an error caused by a targeting error or spelling error. User-initiated text correction becomes more difficult with each additional input character, typically requiring the deletion of the input characters added after the first incorrect input character as well as the incorrect input character itself. This is inconvenient, awkward and time consuming particularly when at or near the end of the word. The method 1100 presents a solution for correcting the text at any time after an incorrect input character is input without cluttering the user interface. In some examples, this is archived by displaying only the mostly highly ranked predicted set of characters. This avoids cluttering the user interface with less likely predictions which divert the user's attention from the virtual keyboard 1120 when typing.

In other examples, a number of a predicted set of characters can be displayed. To limit potential distractions to the user, the processor 102 can determine which of the predicted sets of characters to display based on the ranking in 1040. For example, only predicted set of characters having a likelihood which exceeds a threshold level of likelihood may be displayed. A predetermined number of the predicted set of characters may be displayed in order to limit the displayed predicted set of characters.

While not shown, the processor 102 can be configured to highlight the keys in the virtual keyboard corresponding to the character input. For example, if a received input is "teech", the "T", "E", "C" and "H" keys are highlighted in the virtual keyboard 1120. Examples of highlighting a key include backlighting, brightening, underlining, bolding, italicizing, changing the color, changing the size, using combinations thereof, or in any other way for making the displayed set of characters more visible. The highlighting may be applied to the entire key or to portions of the key, such as the edge around each key, the character displayed within each key, areas within each key, or areas surrounding each key.

Figure 11B:
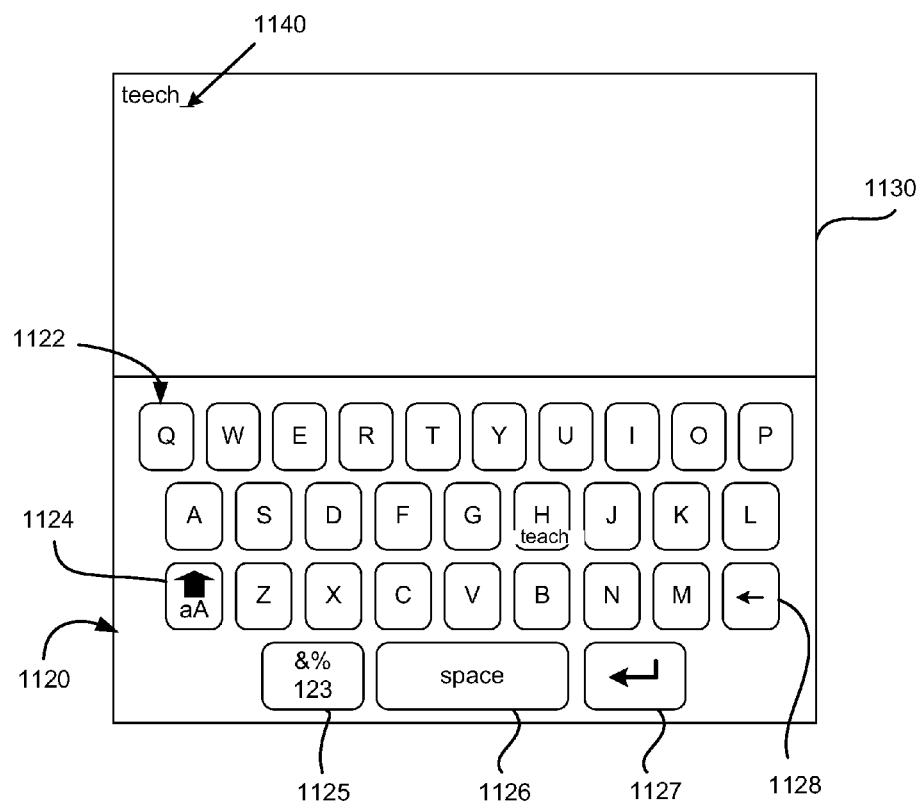

Referring now to FIG. 11B-E, the display of the mostly highly ranked predicted set of characters at a location associated with a key of the virtual keyboard of the display which corresponds to a last input character by the user will be described. In FIG. 11B, the set of characters "teech" is received as input by the touchscreen 118 and displayed in the input field 1130 followed by the cursor 1140. The processor 102 has generated a number of a predicted set of characters and determined the predicted set of characters "teach" to be the mostly highly ranked predicted set of characters. The last input character is the letter "H" so the predicted set of characters "teach" is displayed at the location of the "H" key.

Figure 11C:
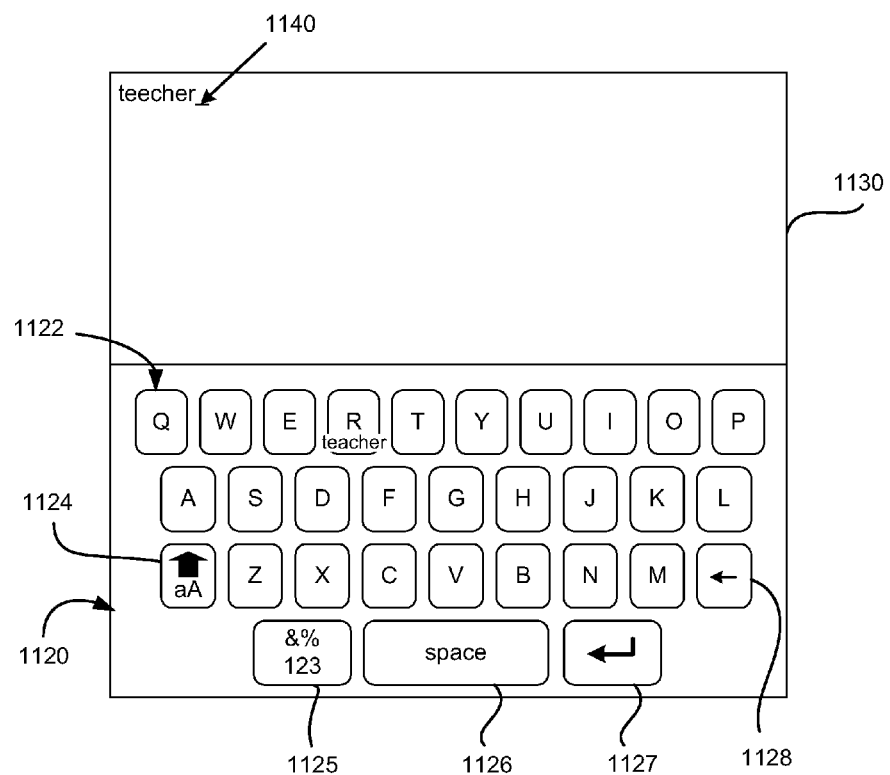

In FIG. 11C, the set of characters "teecher" is received as input by the touchscreen 118 and displayed in the input field 1130 followed by the cursor 1140. The processor 102 has generated a number of a predicted set of characters and determined the predicted set of characters "teacher" to be the mostly highly ranked predicted set of characters. The last input character is the letter "R" so the predicted set of characters "teacher" is displayed at the location of the "R" key.

Figure 11D:
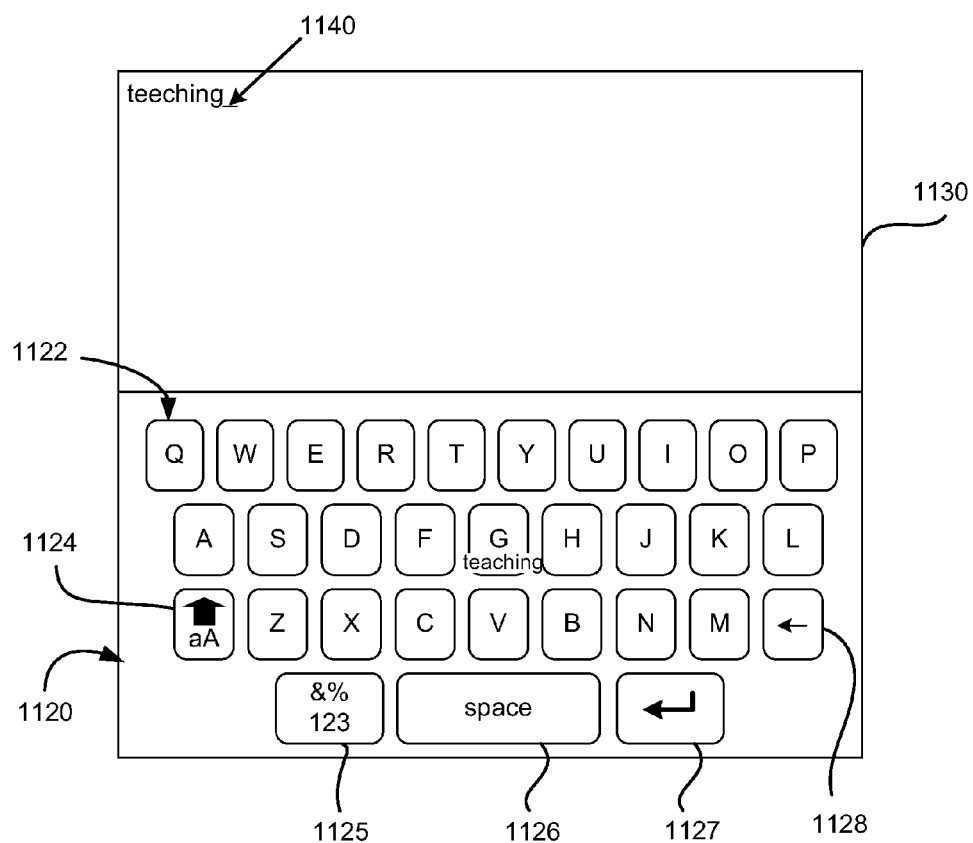

In FIG. 11D, the set of characters "teeching" is received as input by the touchscreen 118 and displayed in the input field 1130 followed by the cursor 1140. The processor 102 has generated a number of a predicted set of characters and determined the predicted set of characters "teaching" to be the mostly highly ranked predicted set of characters. The last input character is the letter "G" so the predicted set of characters "teaching" is displayed at the location of the "G" key.

Figure 11E:
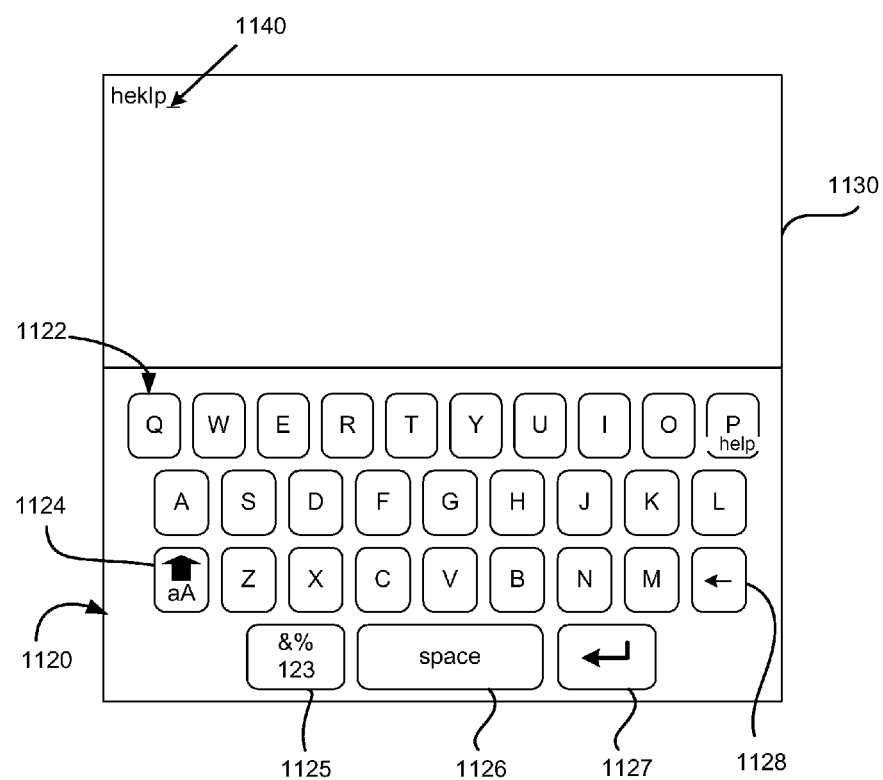

In FIG. 11E, the set of characters "heklp" is received as input by the touchscreen 118 and displayed in the input field 1130 followed by the cursor 1140. The processor 102 has generated a number of a predicted set of characters and determined the predicted set of characters "help" to be the mostly highly ranked predicted set of characters. The last input character is the letter "P" so the predicted set of characters "help" is displayed at the location of the "P" key.

When the mostly highly ranked predicted set of characters at a location on the virtual keyboard 1120 corresponding to a last input character by the user, the received text (which is not recognized and does not match any predicted set of characters) may also be displayed at a location of the <SPACE> key 1126 and/or "Enter" key 1127 for confirmation before continuing with the next word.

As mentioned previously, a user can use a finger or stylus to swipe a predicted set of characters displayed on the virtual keyboard 1120 to input that predicted set of characters. An individual letter, in contrast, can be input by tapping a respective key in the virtual keyboard 1120 using a finger or stylus. The touchscreen 118 differentiates between tap and swipe events using movement and duration of touch events, the details of which are known in the art and need not be described herein. Each key in the virtual keyboard 1120 and each display predicted set of characters has an associated target area on the touchscreen 118. The target area associated with each displayed predicted set of characters can be larger than and/or overlap with the target area of a key with which it is associated and possibly nearby keys, such as neighboring keys in the same row. A user need only swipe on or nearby a displayed predicted set of characters to input the predicted set of characters. This permits faster input of a predicted set of characters by creating larger and more accessible target areas, thereby saving time and processing cycles. In some examples, a predicted set of characters can be input by detecting a swipe in any direction at or near the displayed predicted set of characters. In other examples, a predicted set of characters can only be input by detecting a swipe in a particular direction at or near the displayed predicted set of characters (e.g., up swipe). In some examples, the swipe is at or near the displayed predicted set of characters when the swipe has an initial contact point within the target area associated with the displayed predicted set of characters (which may be the same or larger than the displayed predicted set of characters).

Figure 12:
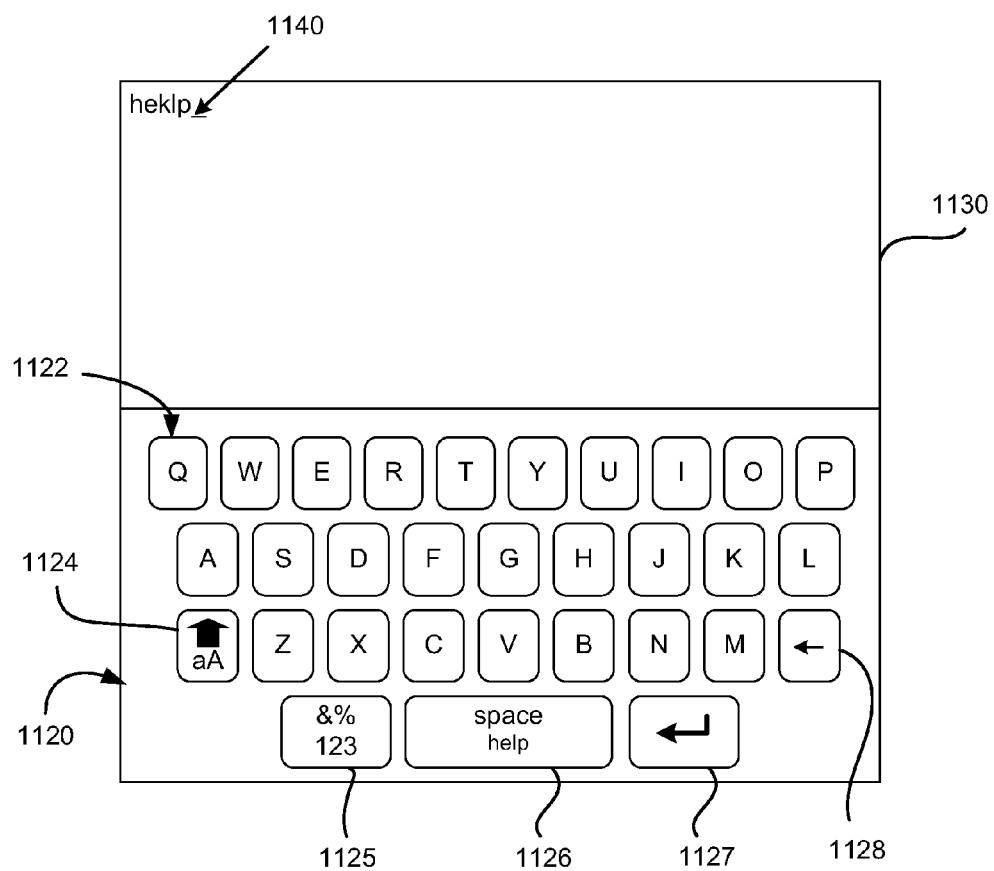
FIG. 12 shows an example front view of a user interface screen including a virtual keyboard displayed on a touchscreen illustrating corrective word prediction consistent with another embodiment disclosed herein

Referring now to FIG. 12, the display of the mostly highly ranked predicted set of characters at a location of the <SPACE> key 1126 will be described. In FIG. 12, the set of characters "heklp" is received as input by the touchscreen 118 and displayed in the input field 1130 followed by the cursor 1140. The processor 102 has generated a number of a predicted set of characters and determined the predicted set of characters "help" to be the mostly highly ranked predicted set of characters, so the predicted set of characters "help" is displayed at the location of the <SPACE> key 1126.

In the shown examples of FIGS. 11B to 12, the predictor predicts a set of characters which corrects received text input. The candidate word corrections may replace letters in the received text as shown in FIGS. 11B to 11D and/or remove letters in the received text as shown in FIGS. 11E and 12. While not shown in the illustrated examples, the candidate word corrections may also complete the received text input while correcting the received text.

The method 1000 may be combined with the method 200 so that the candidate word corrections are shown along candidate word predictions which do not involve correcting the received text. In such examples, the candidate word predictions are shown in a first format and the candidate word corrections are shown in a second format different from the first format. The first format may be a first colour (e.g., black or white) and the second format may be a second colour (e.g., yellow or red). The first and second format may differ in terms of colour, highlighting, underlining, bolding, italicizing or any combination thereof, or other suitable way for differentiating between candidate word predictions and candidate word corrections.

While the various methods of the present disclosure have been described in terms of functions shown as separate blocks in the Figures, the functions of the various blocks may be combined during processing on an electronic device. Furthermore, some of the functional blocks in the Figures may be separated into one or more sub steps during processing on an electronic device.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method, comprising:
   displaying a virtual keyboard on a touchscreen, the virtual keyboard including a plurality of character keys and at least some of the keys are configured for displaying characters;
   receiving an input of one or more characters from the virtual keyboard;
   generating a set of predicted words in accordance with the input of one or more characters;
   determining that a plurality of the predicted words in the set correspond to a plurality of subsequent candidate input characters;
   displaying in a first format a predicted word which represents a candidate word correction which corrects the input of one or more characters, wherein the candidate word correction is displayed at a location within the virtual keyboard adjacent a last input character and in a manner that does not overlap with any other key on the virtual keyboard;
   displaying in a second format different from the first format a subset of the plurality of predicted words at a plurality of select locations within the virtual keyboard, wherein the subset of the plurality of predicted words represent candidate word predictions which do not correct the input of one or more characters, the plurality of select locations being selected using the plurality of subsequent candidate input characters, wherein the candidate word predictions are positioned adjacent the corresponding subsequent candidate input character and in a manner that does not overlap with any other key on the virtual keyboard; and
   inputting the candidate word correction in response to detecting a swipe on or near the last input character.

2. The method of claim 1, wherein the candidate word correction replaces letters in the received input and/or removes letters in the received input.

3. The method of claim 2, wherein the candidate word correction completes the received input while correcting the received input.

4. The method of claim 1, wherein the candidate word prediction is a highest ranked word which corrects the input of one or more characters.

5. The method of claim 1, wherein the inputting comprises replacing the current word in an input field with the displayed predicted set of characters.

6. An electronic device, comprising:
   a processor;
   a touchscreen coupled to the processor;
   wherein the processor is configured to:
      display a virtual keyboard on a touchscreen, the virtual keyboard including a plurality of character keys and at least some of the keys are configured for displaying characters:
      receive an input of one or more characters from the virtual keyboard;
      generate a set of predicted words in accordance with the input of one or more characters;
      determine that a plurality of the predicted words in the set correspond to a plurality of subsequent candidate input characters;
      display in a first format a predicted word which represents a candidate word correction which corrects the input of one or more characters, wherein the candidate word correction is displayed at a location within the virtual keyboard adjacent a last input character and in a manner that does not overlap with any other key on the virtual keyboard;
      displaying in a second format different from the first format a subset of the plurality of predicted words at a plurality of select locations within the virtual keyboard, wherein the subset of the plurality of predicted words represent candidate word predictions which do not correct the input of one or more characters, the plurality of select locations being selected using the plurality of subsequent candidate input characters, wherein the candidate word predictions are positioned adjacent the corresponding subsequent candidate input character and in a manner that does not overlap with any other key on the virtual keyboard; and
      input the candidate word correction in response to detecting a swipe on or near the last input character.

7. The electronic device of claim 6, wherein the candidate word correction replaces letters in the received input and/or removes letters in the received input.

8. The electronic device of claim 7, wherein the candidate word correction completes the received input while correcting the received input.

9. The electronic device of claim 6, wherein the candidate word prediction is a highest ranked word which corrects the input of one or more characters.

10. The electronic device of claim 6, wherein the processor is configured to replace the current word in an input field with the displayed predicted set of characters.

11. The electronic device of claim 6, wherein the processor is configured to highlight keys in the virtual keyboard corresponding to the received input.

12. The method of claim 1, further comprising:
highlighting keys in the virtual keyboard corresponding to the received input.

13. A non-transitory machine readable medium having tangibly stored thereon executable instructions that, when executed by a processor of a handheld electronic device, cause the handheld electronic device to perform a method on an electronic device, the method comprising:
displaying a virtual keyboard on a touchscreen, the virtual keyboard including a plurality of character keys and at least some of the keys are configured for displaying characters;
receiving an input of one or more characters from the virtual keyboard;
generating a set of predicted words in accordance with the input of one or more characters;
determining that a plurality of the predicted words in the set correspond to a plurality of subsequent candidate input characters:
displaying in a first format a predicted word which represents a candidate word correction which corrects the input of one or more characters, wherein the predicted word is displayed at a location within the virtual keyboard adjacent a last input character and in a manner that does not overlap with any other key on the virtual keyboard;
displaying in a second format different from the first format a subset of the plurality of predicted words at a plurality of select locations within the virtual keyboard, wherein the subset of the plurality of predicted words represent candidate word predictions which do not correct the input of one or more characters, the plurality of select locations being selected using the plurality of subsequent candidate input characters, wherein the candidate word predictions are positioned adjacent the corresponding subsequent candidate input character and in a manner that does not overlap with any other key on the virtual keyboard; and
inputting the candidate word correction in response to detecting a swipe on or near the last input character.

14. The method of claim 1, further comprising:
determining a rank for each predicted word in the set of predicted words based on the input of one or more characters;
wherein only a single highest ranked word corresponding to each subsequent candidate input character is displayed at each respective select location, and wherein each highest ranked word corresponding to each subsequent candidate input character is positioned adjacent the corresponding subsequent candidate input character and in a manner that does not overlap with any other key on the virtual keyboard.

15. The electronic device of claim 6, wherein the processor is further configured to:
determine a rank for each predicted word in the set of predicted words based on the input of one or more characters;
wherein only a single highest ranked word corresponding to each subsequent candidate input character is displayed at each respective select location, and wherein each highest ranked word corresponding to each subsequent candidate input character is positioned adjacent the corresponding subsequent candidate input character and in a manner that does not overlap with any other key on the virtual keyboard.

16. The non-transitory machine readable medium of claim 13, wherein the method further comprises:
determining a rank for each predicted word in the set of predicted words based on the input of one or more characters;
wherein only a single highest ranked word corresponding to each subsequent candidate input character is displayed at each respective select location, and wherein each highest ranked word corresponding to each subsequent candidate input character is positioned adjacent the corresponding subsequent candidate input character and in a manner that does not overlap with any other key on the virtual keyboard.

* * * * *